(12) United States Patent
Coetzee

(10) Patent No.: US 7,967,302 B2
(45) Date of Patent: Jun. 28, 2011

(54) MULTI-FUNCTION CONVERTIBLE BEACH CHAIR AND COOLER TRANSPORTER

(76) Inventor: Pieter Hendrik Coetzee, Ft. Lauderdale, FL (US)

( * ) Notice: Subject to any disclaimer, the term of this patent is extended or adjusted under 35 U.S.C. 154(b) by 333 days.

(21) Appl. No.: 12/359,686

(22) Filed: Jan. 26, 2009

(65) Prior Publication Data

US 2010/0187781 A1 Jul. 29, 2010

(51) Int. Cl.
*B62B 1/12* (2006.01)
(52) U.S. Cl. ....... 280/47.18; 280/651; 280/30; 297/16.1
(58) Field of Classification Search .................... 280/30, 280/35, 37, 651, 652, 656, 659, 47.131, 47.17, 280/47.18, 47.24, 47.26, 63; 297/16.1, 34, 297/118; 301/9.1
See application file for complete search history.

(56) References Cited

U.S. PATENT DOCUMENTS

| | | | | |
|---|---|---|---|---|
| 5,480,170 | A * | 1/1996 | Kaiser, II | 280/30 |
| 6,533,298 | B2 * | 3/2003 | Sims | 280/47.26 |
| 7,159,878 | B1 * | 1/2007 | McKenna | 280/78 |
| 7,475,889 | B2 * | 1/2009 | Marmah et al. | 280/47.26 |
| 7,708,290 | B2 * | 5/2010 | Jenkins | 280/47.26 |

* cited by examiner

*Primary Examiner* — John D Walters
(74) *Attorney, Agent, or Firm* — Christopher J. Vandam, PA; Chris Vandam

(57) ABSTRACT

The present invention is a multi-purpose outdoor piece of equipment that combines various features in one design and takes advantage of gravity. In an embodiment it comprises a combination of a cooler or storage bag, two chairs, a table and a rack for an umbrella. The cooler or storage bag stays in a stable orientation due to gravity. The device is quickly assembled into a transport mode and then reassembled into its stationary mode for recreational use. The pull handle can be unscrewed and receive a beach spade to play in the sand. Once assembled into transport mode the device fits comfortably in the trunk of a car and can easily be assembled with the cooler bag slung into position over the axle. The cooler may be used for wet goods like drinks, food, wet wipes and spray bottle and an the upper bag for dry storage like outdoor gear and accessories like keys, sunglasses or other protected items. The cooler bag can also be strapped on as a backpack or a sling bag over your shoulder. The gravity roller van can be attached to the back of your bicycle for more long distance transport.

10 Claims, 20 Drawing Sheets

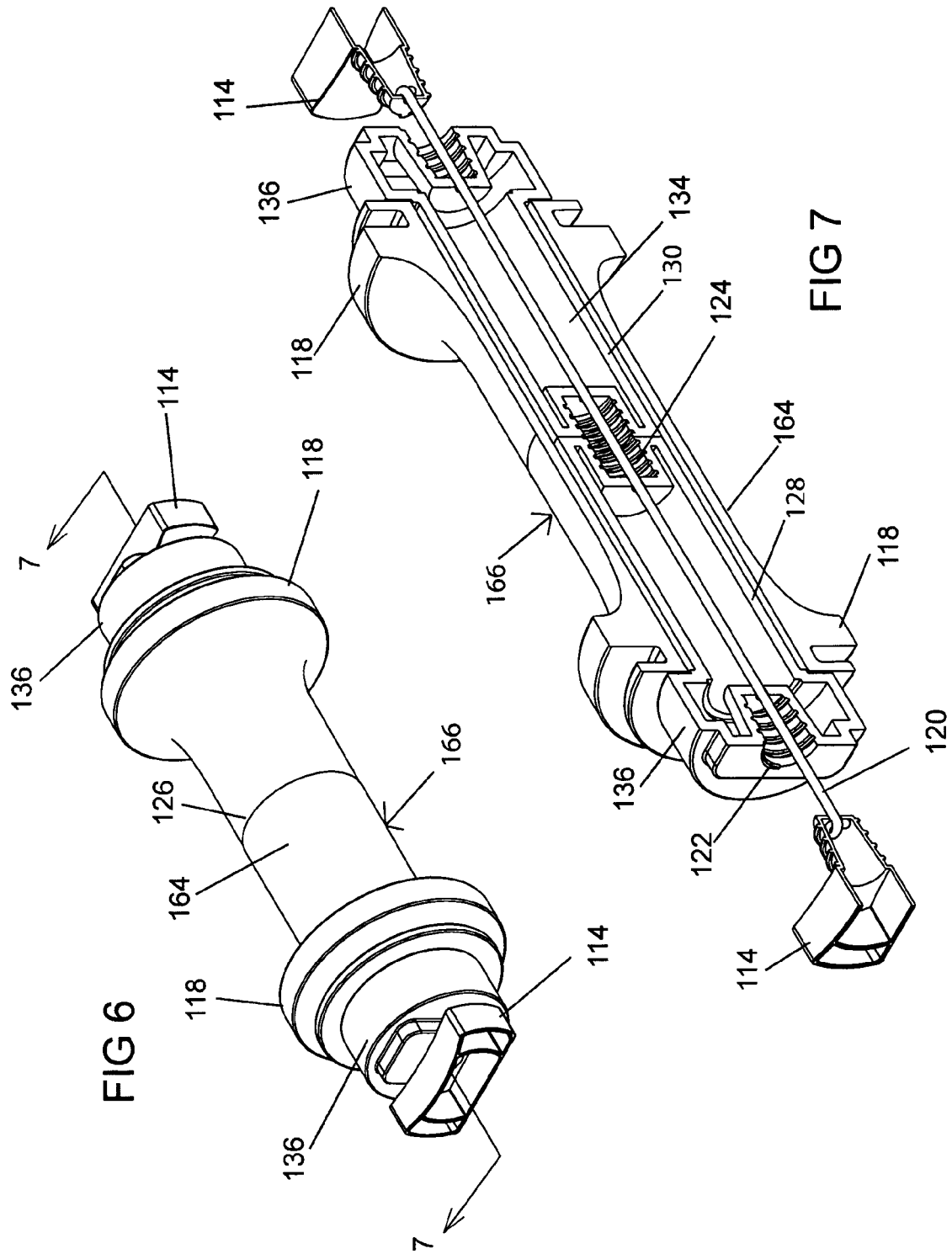

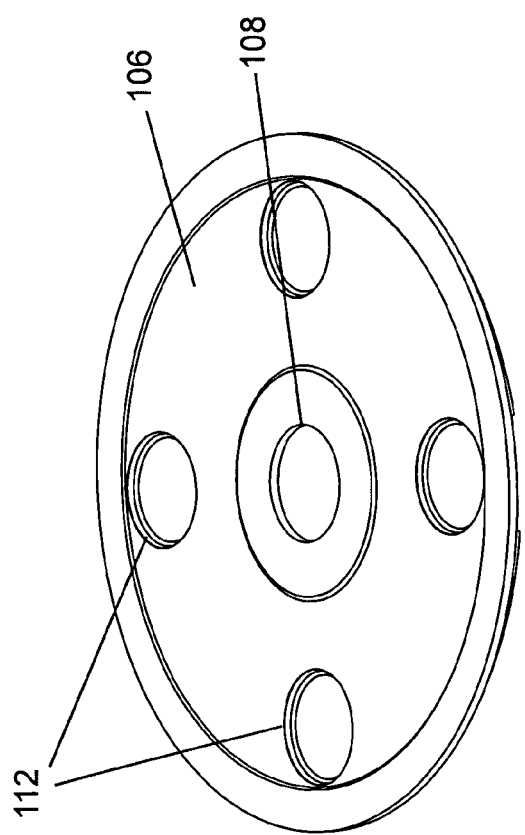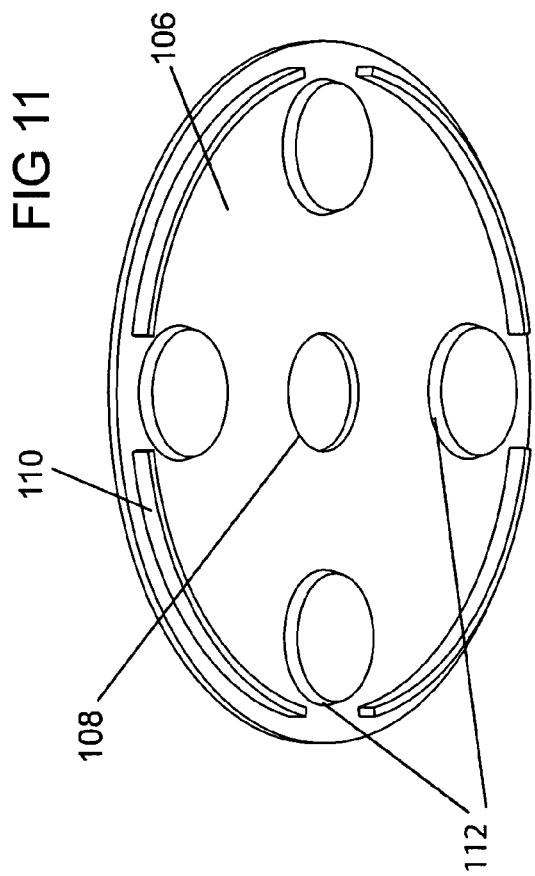
FIG 10
FIG 11

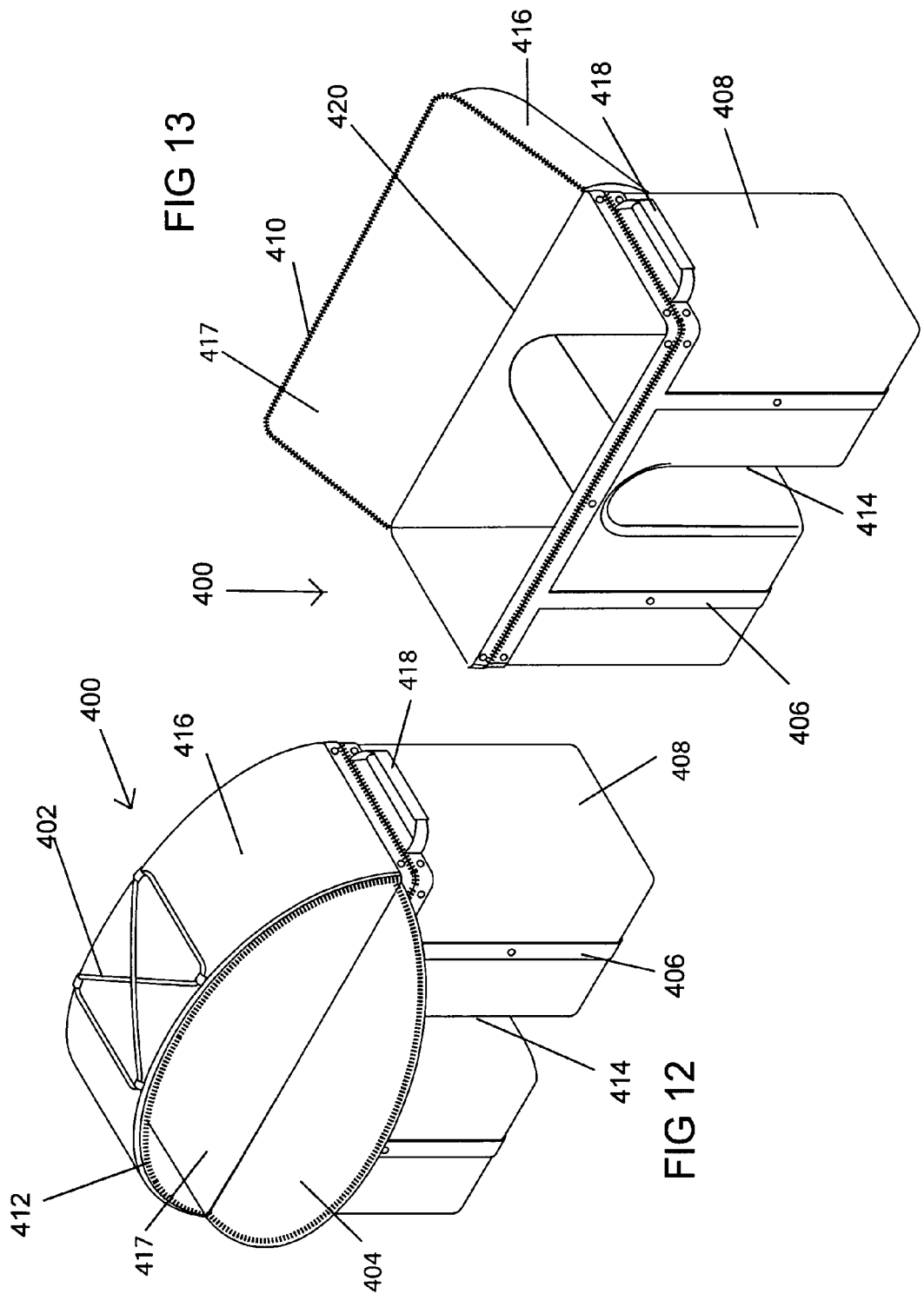

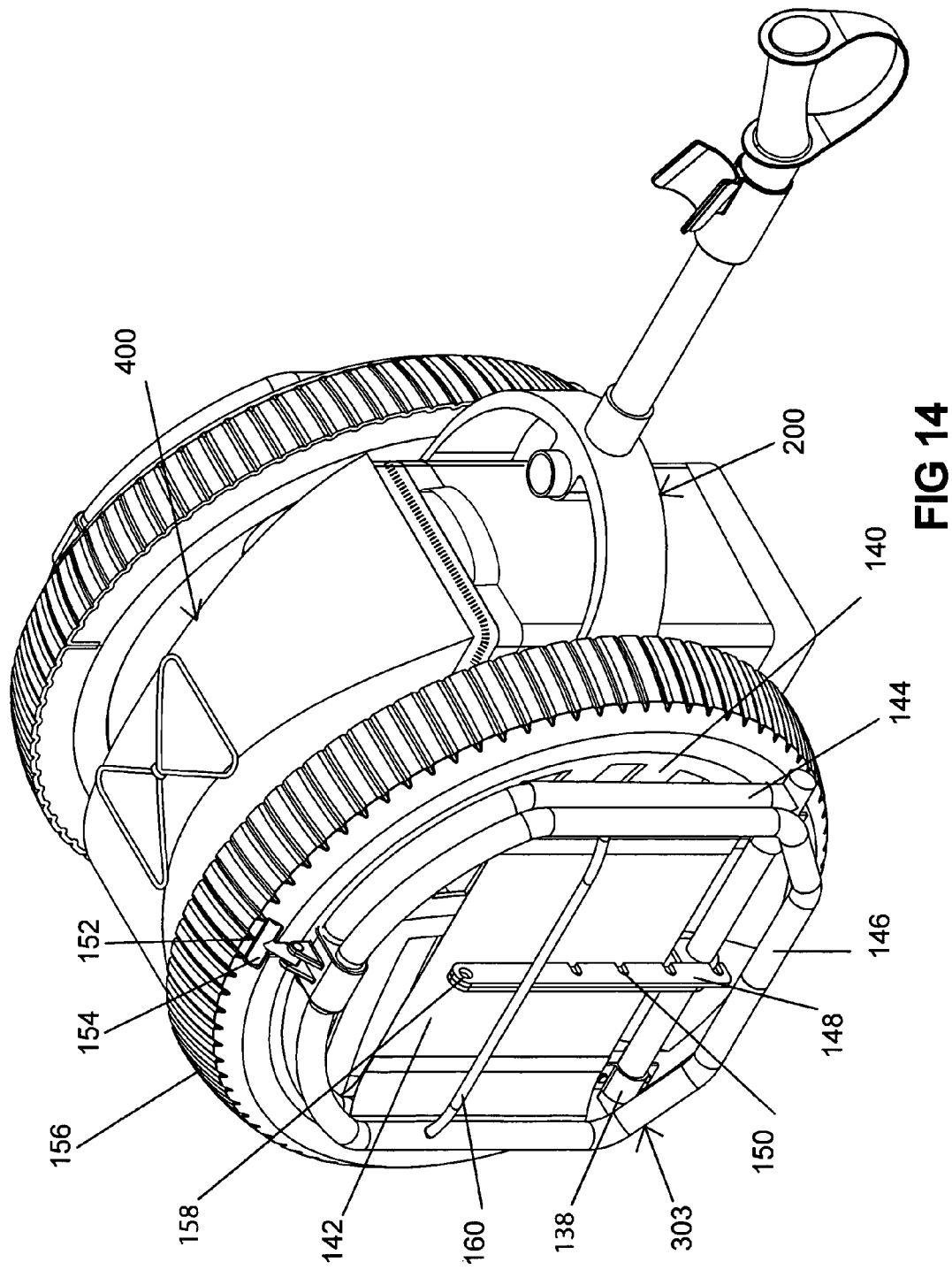

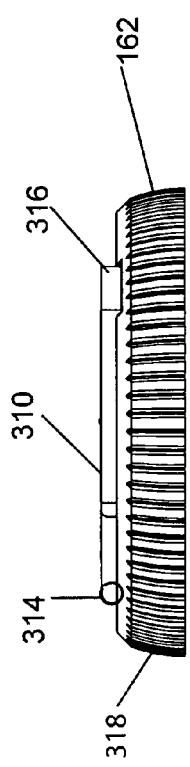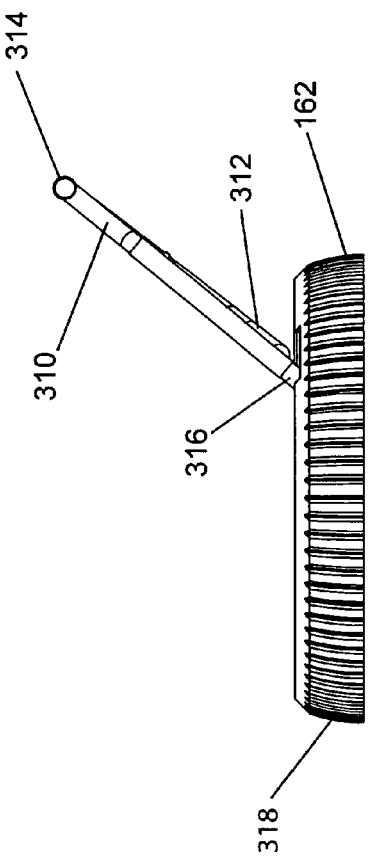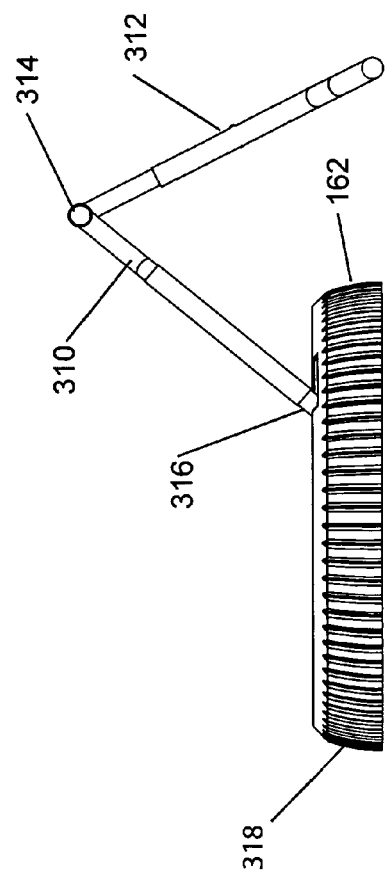

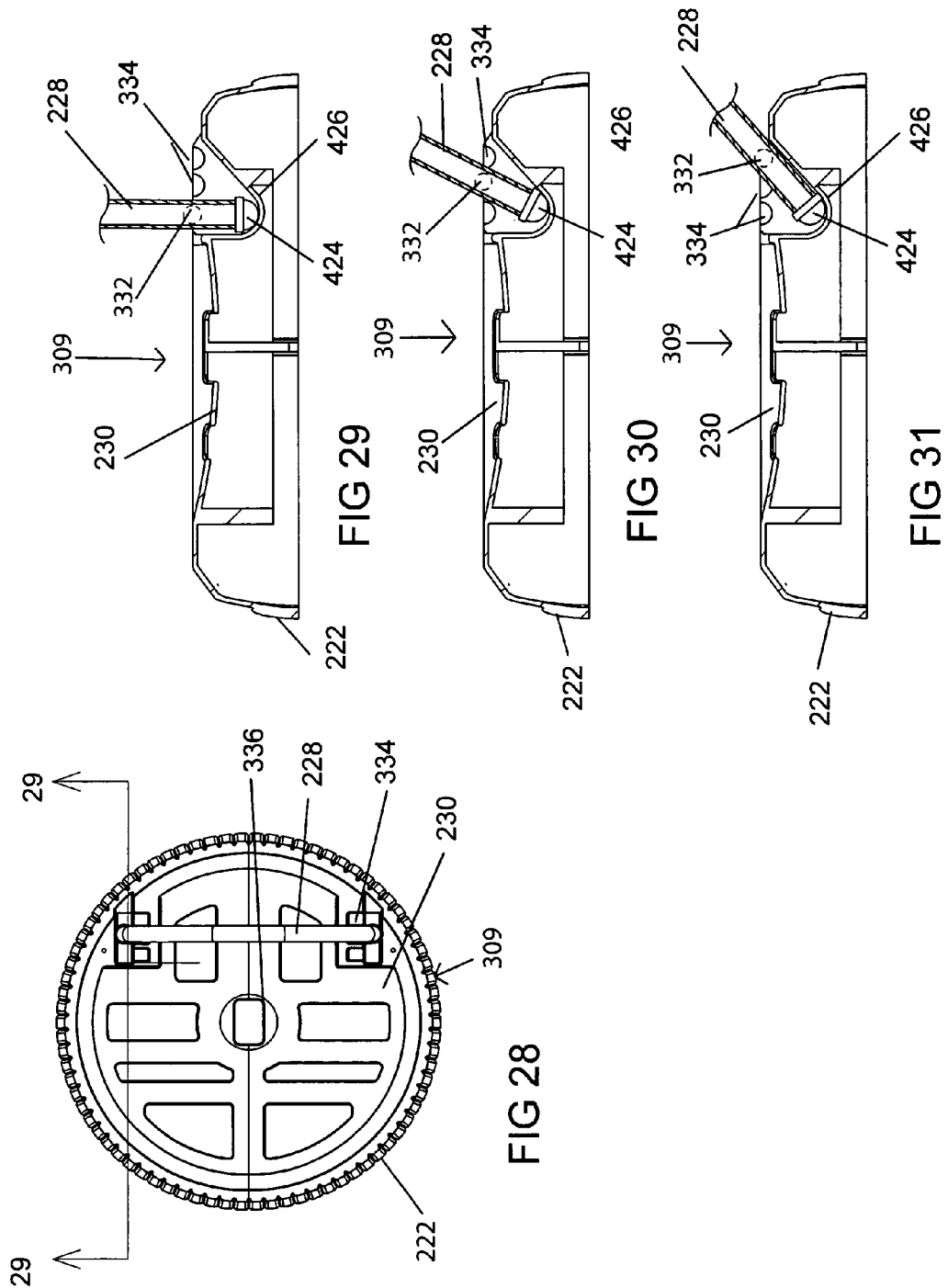

MULTI-FUNCTION CONVERTIBLE BEACH CHAIR AND COOLER TRANSPORTER

BACKGROUND OF THE INVENTION

1. Field of the Invention

The present invention relates to beach gear transporters, and more particularly, to a wheeled beach gear transporter that converts to provide storage, chairs, table and shade.

2. Description of the Related Art

Several designs for wheeled beach gear transporters have been designed in the past. None of them, however, provide for a device that provides all necessary beachgoer accessories comprising, inter alia, chairs, a table, storage and shade that assemble together in a compact manner to form a wheeled package for easy transport to and from the beach or other recreational site.

Applicant believes that the closest reference corresponds to U.S. Pat. No. 6,131,925 issued to Weldon. However, it differs from the present invention because the Weldon invention requires straps to hold the components of the device together during transport, only provides a single chair and does not provide a table surface. Furthermore, the Weldon invention is not readily compatible with larger diameter wheel as is beneficial for mobility on soft ground such as sand. The Weldon invention also does not provide for a stable mounting feature for a sunshade which is desirable for use on firmer ground or in windy conditions.

The present invention solves these problems by providing in a preferred version a compact and large wheeled device that easily converts to provide two chairs a table, an umbrella stand and storage container. Additionally, the configuration of the present invention does not require the use of straps while in its transport mode but instead relies on gravity to hold the storage container securely on the device.

In U.S. Pat. No. 5,269,157, Ciminelli describes an insulated beach box which is adapted to be wheeled or slid over terrain to reach a desired beach location. The beach box has a pivotally connected back which may be used as a handle when moving the box and as a seat back when sitting upon the box. The back includes a flexible member with pockets for storing personal items. While Ciminelli suggests that there is a need for a device to facilitate carrying utilitarian items to and from the beach, his invention provides for an insulated box and a seat/chair only. Ciminelli suggests that a beach umbrella may be stuck into the sand and clamped to the seat back to shade the seat's occupant. However, Ciminelli does not disclose how the umbrella is carried to the beach and no provision for attachment to the beach box is described. During transit, Ciminelli suggests that miscellaneous beach items which can fit between the back and top of the beach box may be held on with a flexible strap.

Carlile, in U.S. Pat. No. 4,865,346, describes a collapsible cart, held together by the frictional engagement of its components and quickly disassembled, which may be used to carry articles to the beach. The cart has a pivotally attached bottom shelf, which may be locked into position with a set of folding braces, for carrying a cooler chest. The cart is supported in an upright position by a rest attached to the edge of the shelf when the shelf is in its locked position. A picnic basket with folding shelf is attached to the cart above the cooler chest. Carlile provides for a single umbrella holder on one of the cart's side arms and beverage holders on the other side arm. Additional bracket arms support one or more folding chairs. On the rear of the cart, a auxiliary storage bag is removably attached.

A beach caddie is described by Higson in U.S. Pat. No. 4,703,944 which incorporates a chair rack and platform assembly, and, when used in a horizontal position at the beach, provides a beach table. The beach caddie apparently provides for the transportation of an umbrella and fishing poles as well as for their storage once at the beach. A topmost hinged section attached to the vertical members may be rotated at a right angle to the vertical members so that shafts of umbrellas and fishing poles may be placed through orifices therein. Such shafts rest upon the "upper cross-member 6" of the caddie although it is not clear whether the shafts engage the holes in the cross-member. It is also not clear what keeps the topmost hinged section from working against and flexing the fishing poles and/or umbrella shaft. The table surface of the caddie has orifices sized to hold umbrella and fishing pole shafts (presumably in an upright position for use) and orifices to hold drinks. Hook and loop fasteners secure the movable members when the caddie is used as a table at the beach.

Bonewicz, in U.S. Pat. No. 4,887,837, describes a carrier for transporting objects to the beach. Bonewicz describes a relatively straight-forward hand cart having a platform which either folds up parallel to the main frame or rotates perpendicularly to form a carrying surface. The platform has locking braces on its underside which engage the side rails to support the weight of the items being transported. In one embodiment the cart has a "cup-like" member located near the lower end of a side frame and a hook-like clasping member mounted higher on the same side frame. An umbrella may be attached with its top end in the cup-like receptacle and the hook-like element encircling its lower end. It is not clear what happens when the umbrella diameter exceeds the size of the hook-like member. The cart is further provided with a picnic basket or bag which may be mounted between the two frame members to carry additional articles. In a preferred embodiment, a hollow bag may be slipped over the upright frame and held by a strap to the handle. In this embodiment, the hook-like member and the cup-like member are not used and an umbrella can not be carried on the cart. Like Ciminelli an elastic cord may be stretch between the upright frame and the platform to restrain items placed on the platform.

While these devices of the prior art address some of the needs of a typical beachgoer, none of the devices address the problems which are solved by the present invention and, in particular, perhaps the most frequently encountered problem of beach activity is not met. No known prior art provide for a beach transport device that works well on both hard and soft surfaces, holds a storage element by gravity reducing the need for straps while imparting stability to the device, provides multiple seats and a table and can hold an umbrella in impenetrable soil.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that increases the ease of transporting essential gear to the beach or other recreational area and then converts to provide two chairs, a table, a shade mount and storage.

It is another object of this invention to provide a device that can easily transport desirable beach gear for at least two people by a single person.

It is still another object of the present invention to provide a device that can easily be transported over soft ground such as sand yet allows for the mounting of a shade umbrella over firm ground.

It is an object of this invention to provide a gravity roller with an insulated cooler or wet-bag and a dry storage upper bag in combination to pack anything into it as may seen fit by the consumer, resulting in ease of transportation when pulled or pushed.

Another object of the invention is to convert into two comfortable chairs.

Another object of this invention is to provide a means to securely erect and transport an umbrella.

An additional purpose of the invention is to provide a lightweight and easy rollable device that is easy to maneuver.

Another object of this invention is to provide a compact device that can be assembled or dissembled easily and quickly.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 shows a perspective view of axle elements comprising a portion of a version of a wheel assembly.

FIG. 7 represents a perspective cross section of the axle elements shown in FIG. 6.

FIG. 10 shows a perspective view of the topside of a table.

FIG. 11 is a perspective view of the underside of the table shown in FIG. 10.

FIG. 12 is a perspective view of a version of a case assembly showing the upper compartment of the case assembly open.

FIG. 13 is a perspective view of the case assembly shown in FIG. 12 with the lower compartment of the case assembly open.

FIG. 14 shows a perspective view of a variation of the device in a transport mode.

FIGS. 22-24 demonstrate a perspective view of the various stages of converting a chair as shown in FIG. 21 from a transport mode to a stationary mode.

FIG. 28 is a plan view of a chair as shown in FIG. 25 in a stationary mode.

FIGS. 29-31 show an elevation cross section of the various adjustments of a chair as shown in FIG. 28.

DETAILED DESCRIPTION OF THE PREFERRED EMBODIMENT

Figure 1:
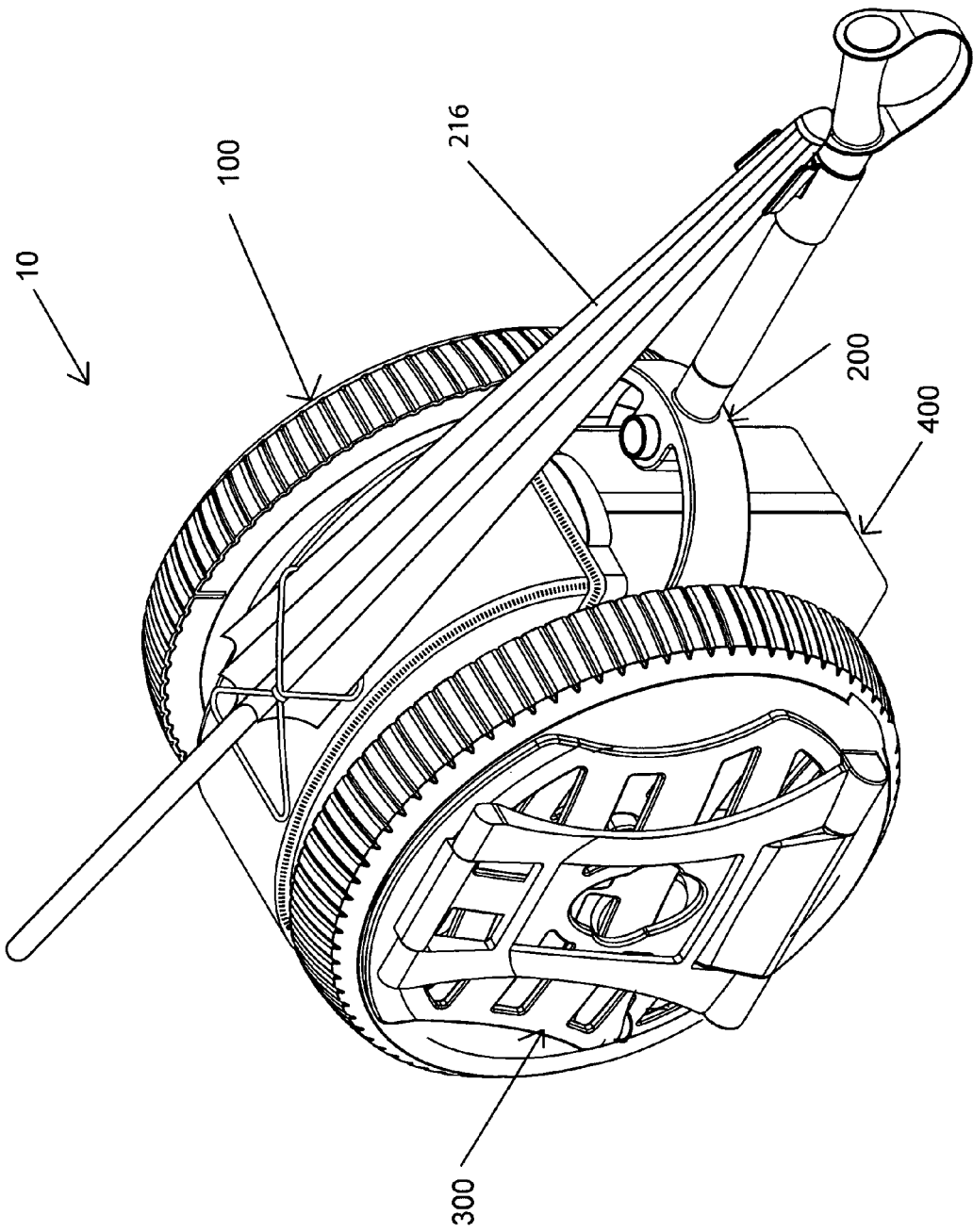
FIG. 1 represents a perspective view of an embodiment of the device in a transport mode.

Referring now to the drawings, where a version the present invention is generally referred to with numeral 10 in FIG. 1 (sometimes referred to as the device), it can be observed that it basically includes a wheel assembly 100, a yoke assembly 200, a chair assembly 300, a case assembly 400 and optionally an umbrella 216.

Two wheel assemblies 100 are preferably present, one on each side of the yoke assembly 200. A case assembly 400 is supported by the yoke assembly 200 and situated between said wheel assemblies 100. Each wheel assembly 100 has affixed to it a chair assembly 300.

The device 10 as shown in FIG. 1 is in transport mode. In transport mode generally each of the two chair assemblies 300 are affixed to one of each of the two wheel assemblies 100. Each of the two wheel assemblies 100 are rotatably attached to the yoke assembly 200. The case assembly 400 rests in place by gravity over the yoke assembly 200. An umbrella 216 rests atop the case assembly 400 and the yoke assembly 200. When the device is in transport mode it can be easily moved or stored.

Figure 2:
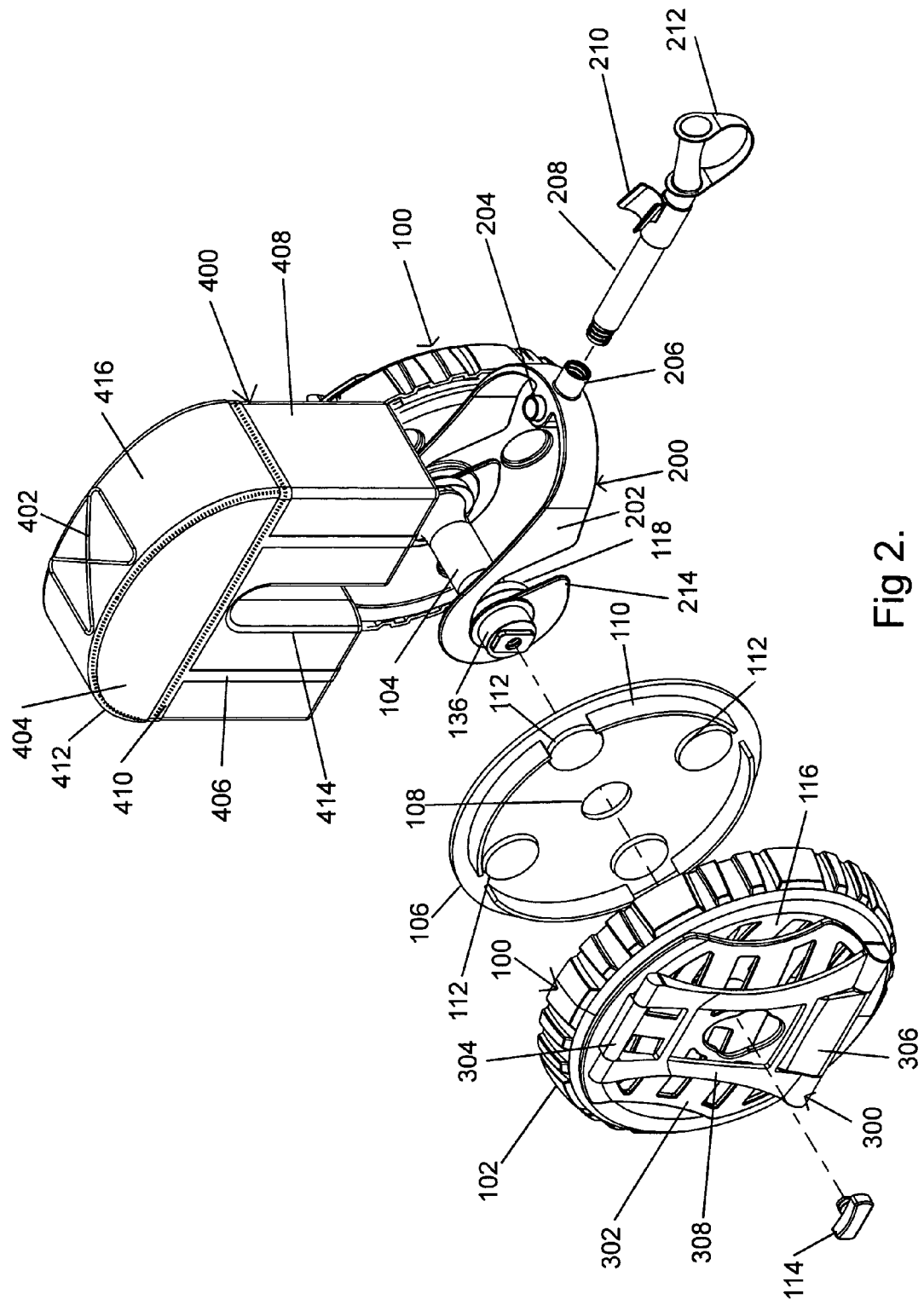
FIG. 2 shows an exploded perspective view of the embodiment shown in FIG. 1 more clearly showing the component parts.

Now referring to FIG. 2 where an exploded perspective view of the version of the invention demonstrated in FIG. 1 is shown to comprise, inter alia, the wheel assembly 100, the yoke assembly 200, the chair assembly 300 and the case assembly 400.

Each of said wheel assemblies 100 is further comprised of, inter alia, a wheel 102, an axle 104, a disk 106, a bore 108, a rib 110, a cup holder 112, a fastener 114, a seat 116, a flange 118 and a seat 136.

Said yoke assembly 200 is further comprised of, inter alia, a yoke 202, a receiver 204, a receiver 206, a shaft 208, a rest 210, a handle 212 and a fork 214.

Each of said chair assemblies 300 is further comprised of, inter alia, a back 302, a hinge 304, a hinge 306 and a support 308.

Said case assembly 400 is further comprised of, inter alia, a strap 402, a panel 404, a frame 406, a case 408, a seam 410, a seam 412, a saddle 414 and a panel 416.

Still referring to FIG. 2 where the invention is shown in an exploded view it can be understood that one each of said wheels 102 are positioned on each side of said yoke 202. Between each of said wheels 102 and said yoke 202 is a disk 106. Said disk 106 optionally has a multiplicity of cup holders 112 around the periphery of the disk 106 that are dimensioned to accept standard sized drinking cups. Said disk 106 optionally has a rib 110 integrally formed or affixed to the underside of the disk 106 to lend structural rigidity to the disk 106.

When the device 10 is in a transport mode the disk 106 is nested onto the bottom side of the wheel assembly 100. The chair assembly 300 is nested onto the top side of the wheel assembly 100. The bore 108 through the disk 106 is rotatably and removably affixed to the axle 104 on seat 136. A fastener 114 attaches each wheel assembly 100, chair assembly 300 and disk 106 to the axle 104. The yoke assembly 200 at each of the forks 214 is held by gravity onto the axle 104 between flange 118 and seat 136. A handle 212 is connected to the yoke 202 via a shaft 208 that connects to the yoke 202 at receiver 206. A rest 210 is positioned along the shaft 208 and holds one end of an umbrella 216 (not shown in FIG. 2) while the strap 402 fastens the opposite end. The saddle 414 of the case assembly 400 straddles the axle 104 between each arm of the yoke 202 and is held in place by gravity.

Figure 3:
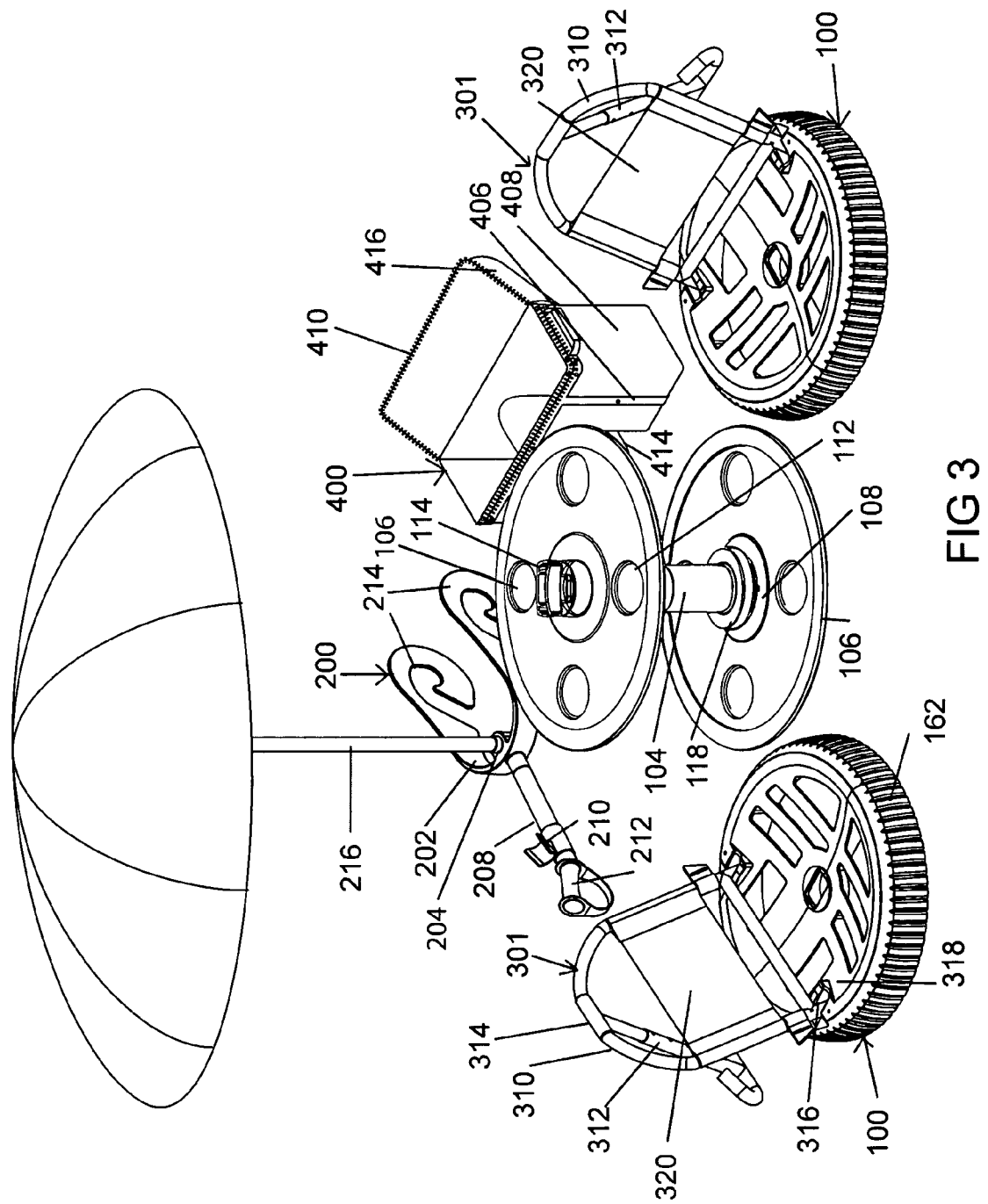
FIG. 3 illustrates an example of an embodiment of the device as it would be assembled in a stationary mode ready for use.

Now referring to FIG. 3 where a variation of the device 10 is shown in a stationary mode. The variation in FIG. 3 is principally different from that shown in FIG. 1 in regard to the Chair assembly 301. Chair assembly 301 is shown in include, inter alia, a frame 310, a support 312, a hinge 314, a hinge 316, a seat 318, a back 320 and a wheel 162.

The device 10 is generally in its stationary mode when the wheel assemblies 100 are disengaged from the axle 104, the axle 104 is oriented vertical to act as a pedestal for the disk 106. For stability of the disk 106 in stationary mode the opposing disk 106 corresponding to the opposite wheel assembly 100 can be used as a base member in contact with the ground. The fastener 114 may be stored for later use when converting the device 10 into transport mode by placing the fastener 114 in the middle of the upper disk 106.

Further characterizing stationary mode, chair assemblies 301 are erected to form a chair by laying the wheel 162 onto the ground with the seat 318 side up then raising the frame 310 about hinge 316. The support 312 then rotates away from the frame 310 about hinge 314. The end of the support 312 opposite hinge 314 is place in ground contact to provide a stable place for a person to sit. The back 320 spans between the frame 310 to provide a comfortable back rest.

Yet describing the stationary mode of the device as depicted in FIG. 3 the case assembly 400 is removed from over the axle 104. In an embodiment of the device 10 the case assembly 400 may be an insulated cooler to keep cool beverages cool or hot food hot. Preferably the case assembly 400 is openable and sealable at seam 410. Seam 410 may be zipper, hook and loop fastener or any other type of fastener commonly available and known in the art.

Still referring to FIG. 3 the yoke assembly 200 is separated from the wheel assembly 100, chair assembly 300 and case assembly 400 and placed flat onto the ground. The umbrella 216 may then be erected and set into receiver 204 to support the umbrella 216. This is of particular benefit where the umbrella 216 cannot be driven into the ground, for example, in a paved lot while tailgating.

Figure 4:
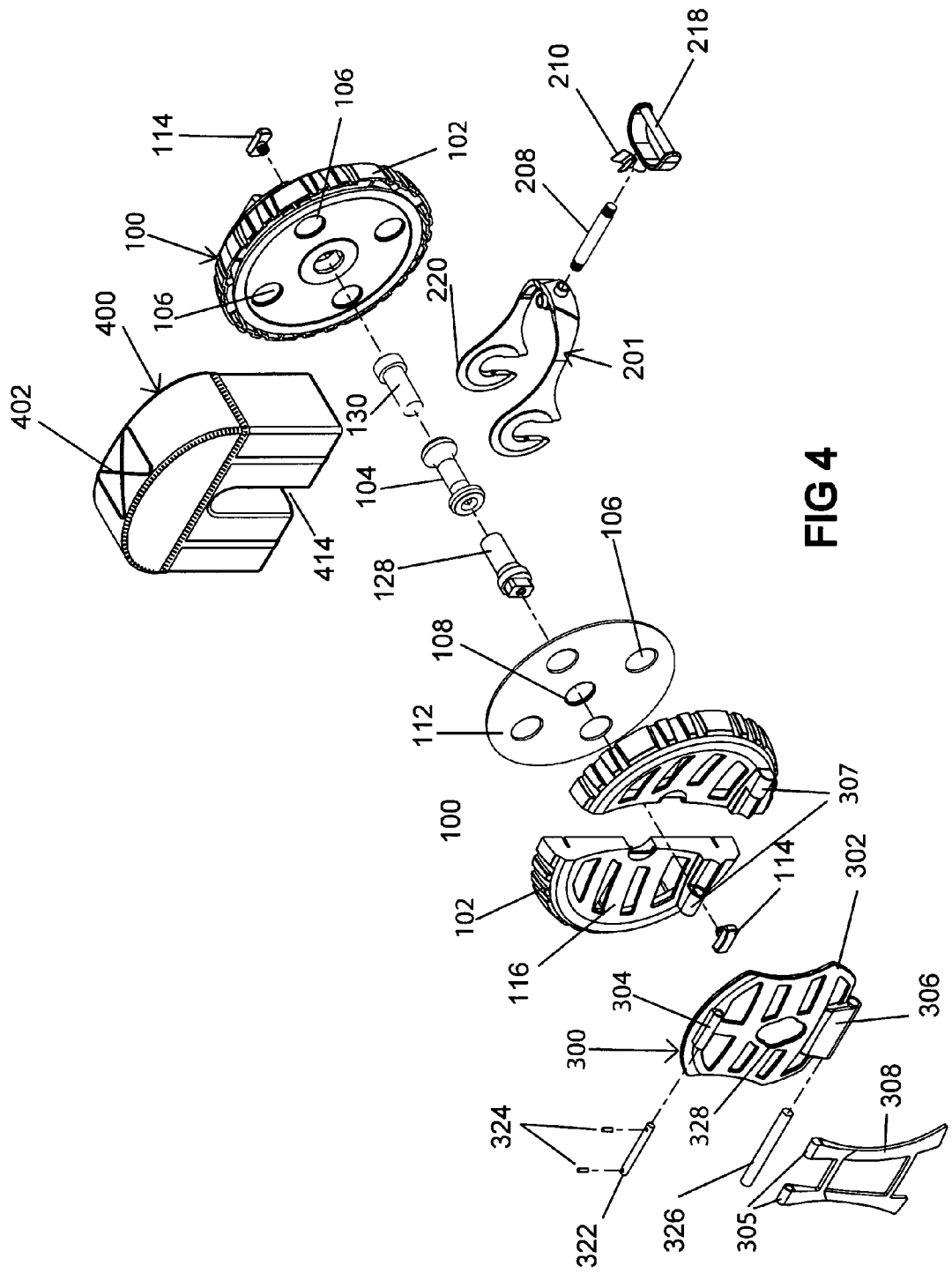
FIG. 4 is a representation of an exploded perspective view of an embodiment of the device demonstrating in more detail the component elements.

Now referring to FIG. 4 where an exploded view of a variation of the device 10 is shown with a chair assembly 100 similar to that demonstrated in FIG. 1, an alternate yoke assembly 201 and an alternate handle 218.

The chair assembly 300 in FIG. 4 is further shown to include a hinge 305, a hinge 307 a hinge pin 322, pins 324, hinge pins 326 and a port 328. For ease of manufacture wheel 102 may be manufactured in two mirror image halves. When assembling the two halves of the wheel 102, hinge pin 326 is inserted through hinge 306 and into hinges 307 on the wheel 102 before the halves of the wheel 102 are permanently secured to each other. Hinge pin 326 permits the radial movement of the back 302 relative to the seat 116. Hinge 305 on the support 308 corresponds with hinge 304 on the back 302 by means of hingepin 322 secured into hinge 305 with pins 324 to permit radial articulation of the support 308 relative to the back 302.

Still referring to FIG. 4 said alternate yoke assembly 201 receives the axle 104 into forks 220. Handle 218 is dimensioned to be used by a human hand to pull the device 10 while in transport mode. A spindle 128 and a spindle 130 join together inside the axle 104. Said wheel assemblies 100 are removably affixed to the respective spindle 128 and spindle 130 by means of fasteners 114. Spindle 128 and spindle 130 both freely rotate inside of axle 104 thereby permitting said wheel assemblies 100 to rotate to facilitate moving the device 10 when in transport mode.

Figure 5:
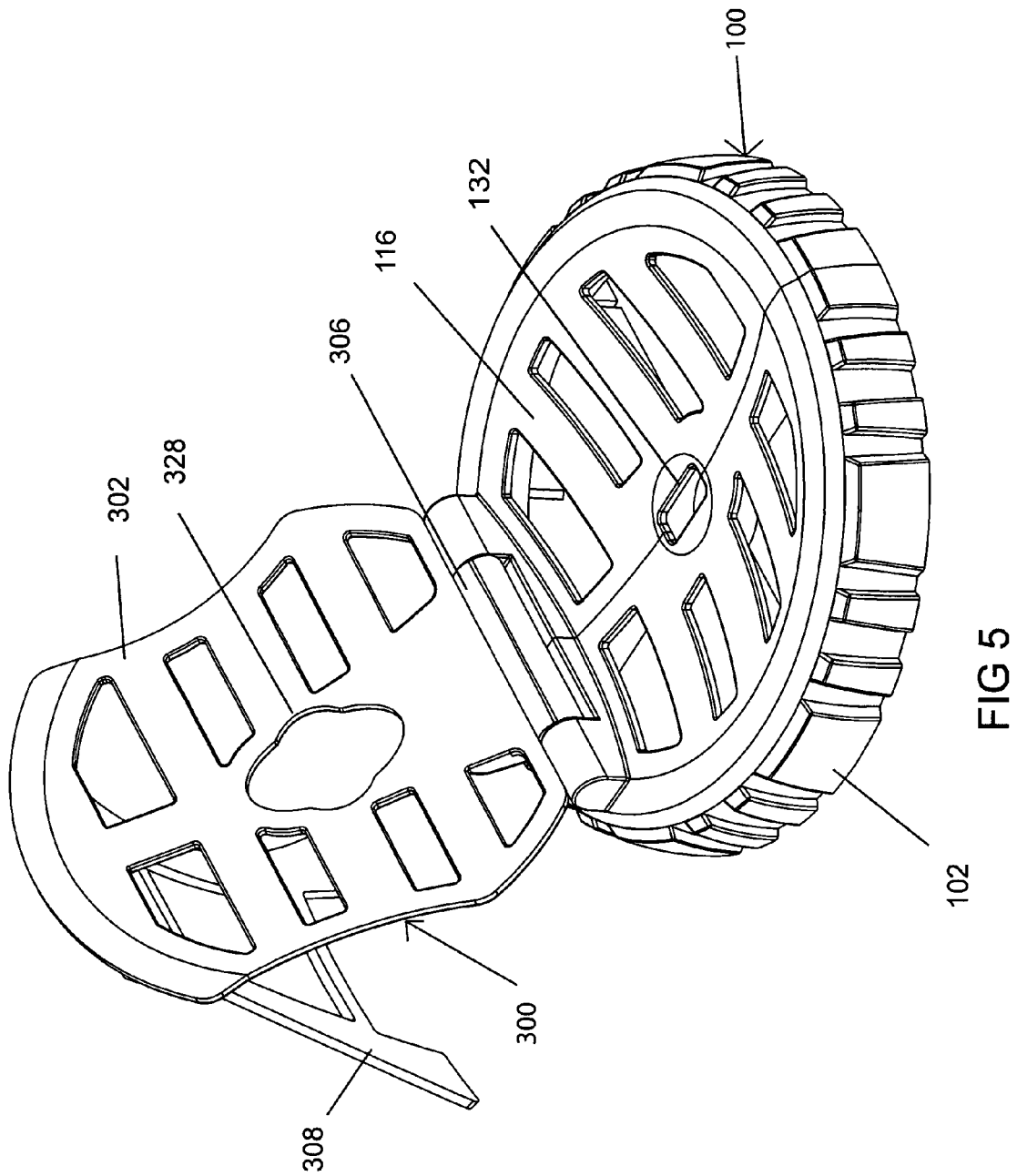
FIG. 5 is a perspective view of a version of a chair configured in its stationary mode ready for use.

Now referring to FIG. 5 where element of the wheel assembly 100 and chair assembly 300 are shown in stationary mode forming a chair suitable for a human to sit. The elements of the chair variation shown in FIG. 5 is materially similar to the chair assembly 300 and wheel assembly shown in FIG. 4. The support 308 is hingedly affixed to back 302. Back 302 is hingedly affixed to seat 116. Seat 116 is preferably formed integral to wheel 102. When the chair shown in FIG. 5 is in use in stationary mode as a chair a person can comfortably sit on seat 116 and lean back onto back 302. Back 302 may be adjusted to varying degrees of reclination by moving support 308 nearer to or farther from the edge of the wheel 102. A port 328 is positioned near the center of the back 302 that overlays a hub 132 to permit a fastener 114 to attach the wheel assembly 100 and chair assembly 300 to the spindle 128 (as shown in FIG. 4).

Figure 8:
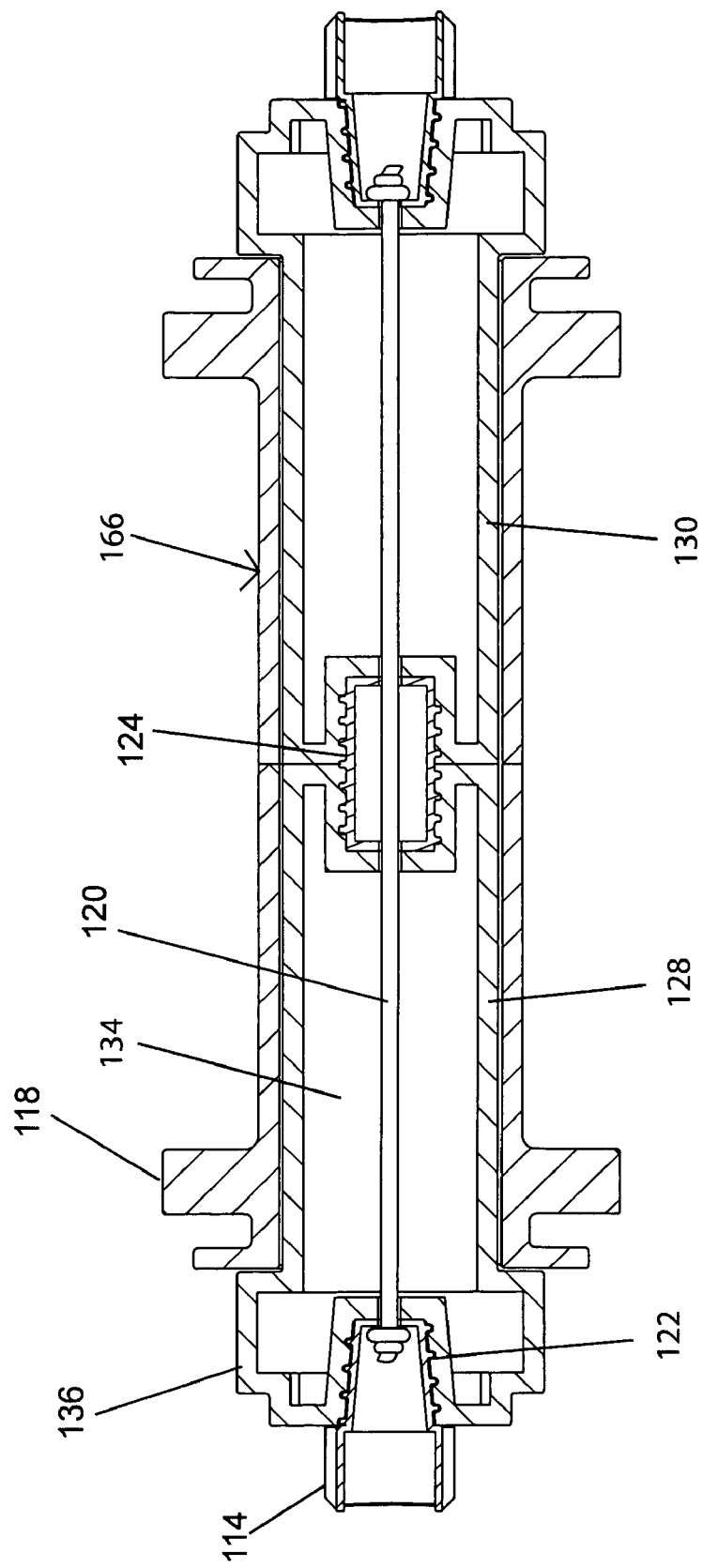
FIG. 8 illustrates an elevation cross section of the axle elements shown in FIG. 6.

FIGS. 6-8 show the same variation of an axle assembly 166 in more detail that includes, inter alia, a fastener 114, a flange 118, a cord 120, a thread 122, a fastener 124, a seam 126, a spindle 128, a spindle 130, a cavity 134, seats 136 and an axle 164. FIG. 7 is a cross section of the view shown in FIG. 6 at section line 7. The axle assembly 166 shown in FIGS. 6 and 7 is configured as it would be used in transport mode as contrasted to stationary mode.

Cord 120 spans through the cavity 134 inside of spindle 128 and spindle 130 and terminates on each end with a fastener 114. The cord 120 is ideally made of an elastic cord but could also be effective if made from an inelastic material such as rope or cable. The function of the cord 120 is to prevent the loss of the fasteners 114 when transitioning the device between stationary mode and transport mode.

Yet referring to FIGS. 6-8, seat 136 is dimensioned to mate with a hub 132 (as shown in FIG. 5) of a wheel assembly 100 to attach the wheel assembly 100 to the axle assembly 166 for transport mode. A wheel assembly 100 is then secured one each to the spindle 128 and spindle 130 by fastener 114 screwed into threads 122. Spindle 128 and spindle 130 are fixed to each other at fastener 124. Wheel assembly 100 may be attached to seat 136. Spindle 128 and spindle 130 may then freely rotate inside of axle 164 to permit the rotation of each wheel assembly 100 when in transport mode. Flange 118 aids in positioning the axle assembly 166 onto the fork 214 of a yoke assembly 200 such as demonstrated in FIG. 2.

Optionally, the axle 164 may be manufactured in two pieces. The axle 164 would then have a seam 126. If present, seam 126 preferably would be permanent.

Figure 9:
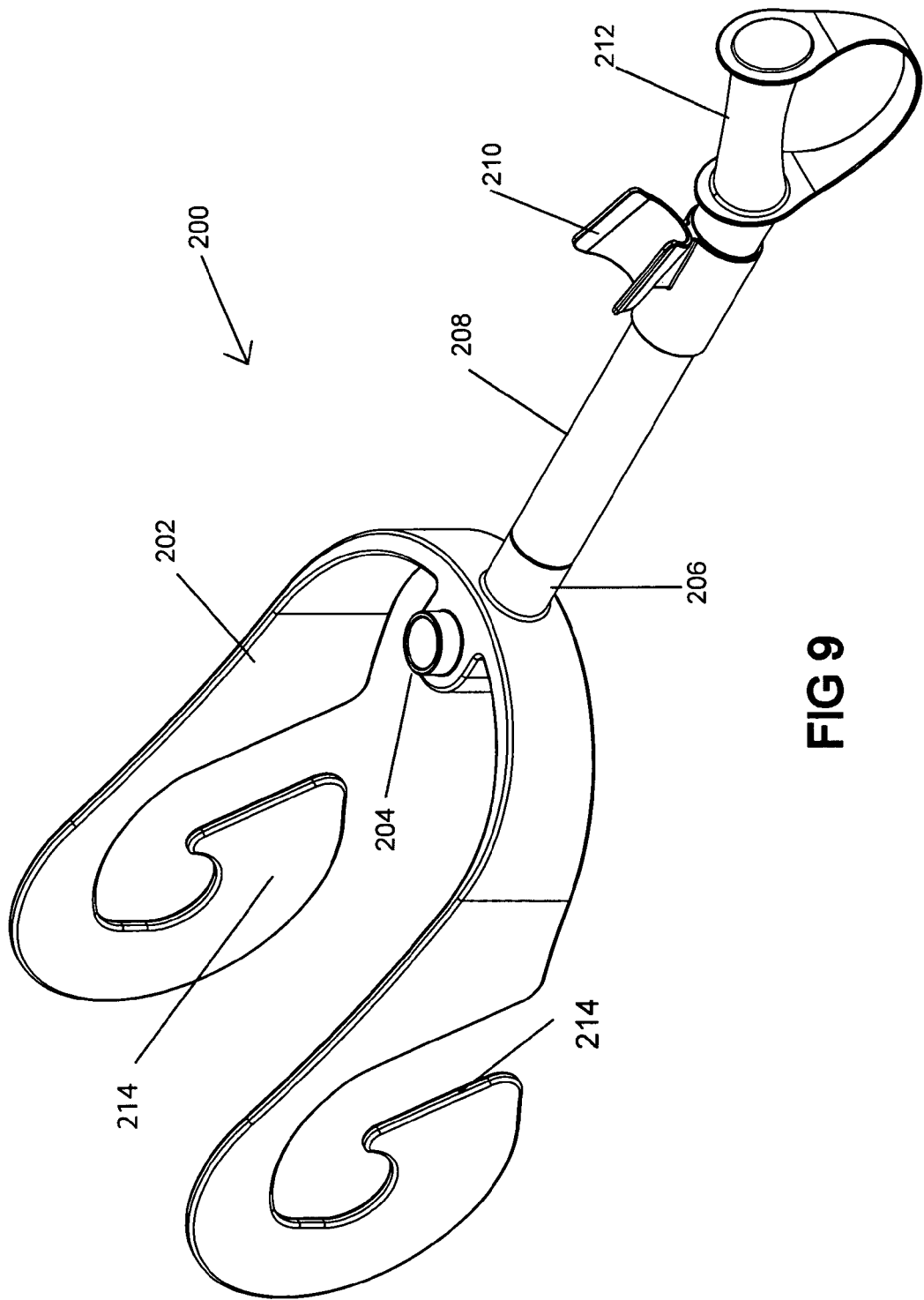
FIG. 9 is a perspective view of elements of a yoke assembly.
Figure 15:
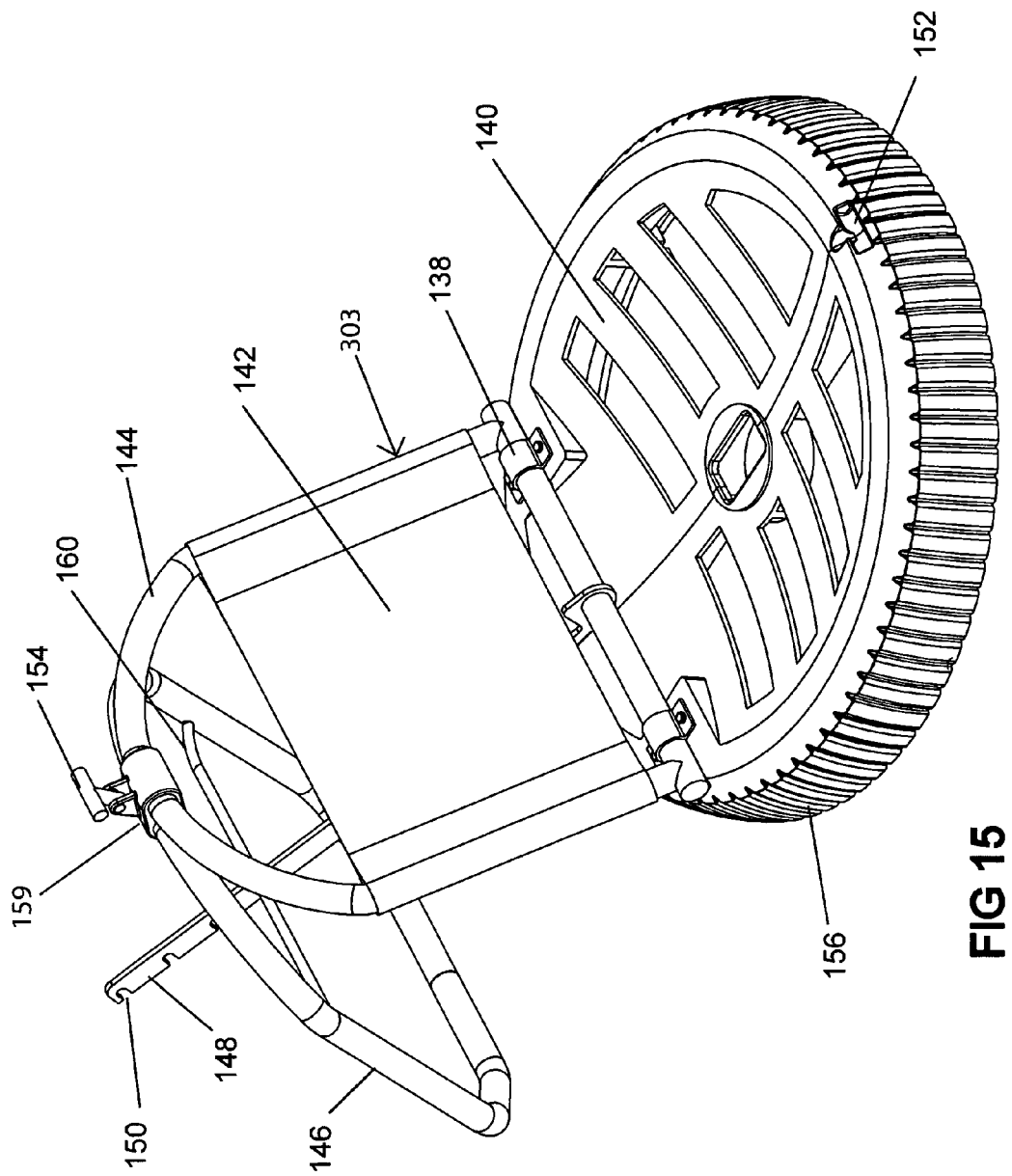
FIG. 15 is a perspective view of a chair as shown in FIG. 14 in stationary mode.
Figure 16:
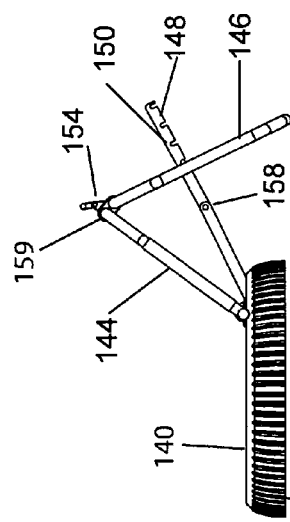
FIGS. 16-19 illustrate the various adjustments of a chair as shown in FIG. 15.
Figure 17:
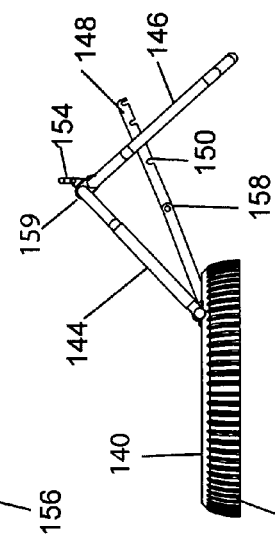
Figure 18:
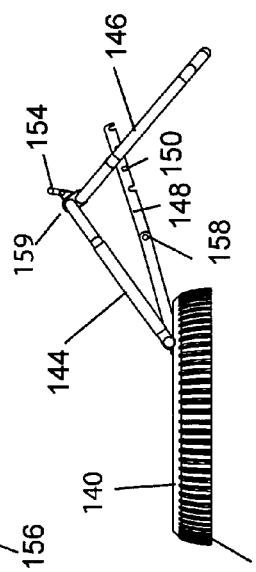
Figure 19:
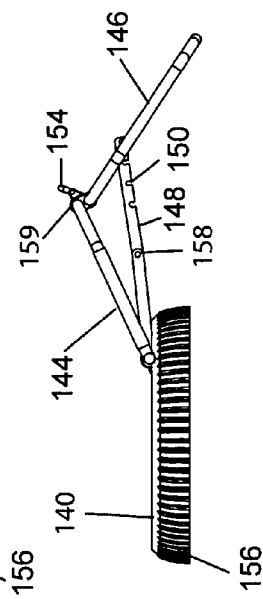

Referring now to FIG. 9 where a yoke assembly 200 is shown isolated from the other elements of the device 10 to reveal more detail and is shown to include, inter alia, a yoke 202, a receiver 204, a receiver 206, a shaft 208, a rest 210, a handle 212 and forks 214.

Said yoke 202 is generally semi-circular in shape and has on each end a fork 214 dimensioned to accept an axle such as axle assembly 166 as shown in FIG. 6. Equidistant from said forks 214 is receiver 204 dimensioned to accept an umbrella such as umbrella 216 shown in FIG. 1 when the device 10 is in stationary mode. Adjacent to receiver 204 is receiver 206 dimensioned to accept shaft 208 which in turn terminates with a handle 212. Near the handle 212 end of the shaft 208 is the rest 210 that holds the umbrella 216 while the device 10 is in transport mode.

FIGS. 10 and 11 demonstrate in more detail the disk 106 and its components that include, inter alia, a bore 108, a rib 110 and several cup holders 112. The disk 106 in FIGS. 10 and 11 is similar to the disk 106 shown in FIGS. 2 and 3. Disk 106 is fit inside the wheel assembly 100 and axle seat 136 fits into bore 108 when in transport mode as shown in FIG. 2. Preferably when in transport mode the edge of the disk 106 is not in ground contact to avoid unnecessary wear on the disk 106. When in stationary mode, as depicted in FIG. 3, the disk 106 is removed from the wheel 102 and erected to form a table with the corresponding disk 106 of the pair acting as a base when in ground contact. One or more cup holders 112 are optionally positioned around the periphery of the disk 106 that are dimensioned to facilitate the insertion and support of a common beverage container. Optionally, a rib 110 is present on one side of the wheel 106 to stiffen and strengthen the disk 106.

FIGS. 12 and 13 show in more detail the case assembly 400 separated from the other various elements of the invention. Said case assembly 400 is shown to include, inter alia, a strap 402, a panel 404, a frame 406, a case 408, a seam 410, a seam 412, a saddle 414, a panel 416, a panel 417, a handle 418 and a hinge 420. The case assembly 400 shown in FIGS. 12 and 13 is similar to the case assembly 400 shown in FIG. 2.

The case assembly 400 is generally forms two hollow interior volumes, a first volume bounded by case 408 and a second volume bounded by panel 416 and panel 417. Said first volume accessible by unsealing seam 410 and raising panel 417 by pivoting about hinge 420. Said seam 410 may include a closure means such as a zipper, straps, hook and loop fasteners, snaps, buttons or other commonly available means to reversibly seal the seam 410. Said second volume is generally bounded by panel 417 and panel 416. The interior of said second volume is opened and closed at seam 412. Said seam 412 may include a closure means such as a zipper, straps, hook and loop fasteners, snaps, buttons or other commonly available means to reversibly seal the seam 412. In one contemplated use of the case assembly 400 said first volume may be insulated and used as a cooler for food and beverages while said second volume may be used to store items preferably kept dry such as a phone, keys, camera and clothes. It would be obvious to one knowledgeable in the art that anything that would fit inside either of said first or second volumes may be placed inside for storage or transport.

Said saddle 414 bisects the case and provides a means to support the case assembly 400 over the axle 104 (shown in FIG. 2) while the device is in transport mode. When in transport mode the case assembly 400 need not be secured with any fastening device to the axle 104 because gravity holds the case assembly 400 securely in place over the axle.

Yet referring to FIGS. 12 and 13 it is shown that a frame 406 may optionally be present to form a cage around the exterior of the case 408 to lend strength and rigidity to the case 408. The frame 406 is increasingly preferred when the case 408 is less rigid, for example when the case 408 is constructed of an insulated soft-sided fabric system.

In the embodiment of the case assembly 400 demonstrated in FIGS. 12 and 13 a strap 402 is present to aid in securing an umbrella to the panel 416 while in transport mode. Handles 418 are present on opposite sides of the case 408 to aid in moving the case assembly 400 when unmounted from the yoke assembly 200 (shown in FIG. 2).

FIG. 14 shows a variation of the invention particularly emphasizing a variation of a chair assembly 303 and shown in transport mode. This variation of the chair assembly 303 is shown to include, inter alia, a hinge 138, a seat 140, a back 142, a frame 144, a frame 146, a bar 148, notches 150, a clip 152, a clip 154, a wheel 156, a hinge 158, a hinge 159 and a bar 160. The case assembly 400 and yoke assembly 200 are similar to those shown in FIG. 2.

FIGS. 15 through 19 show the same chair assembly 303 in stationary mode as depicted in FIG. 14. When transforming from transport mode to stationary mode the wheel 156 and chair assembly 303 are removed from the yoke assembly 200 and case assembly 400 (shown in FIG. 14). The wheel 156 is placed onto the ground or other suitable surface with the seat 140 facing up. Clip 154 is snapped out of clip 152 and the frame 144 is raised about hinge 138. Frame 146 is rotated away from frame 144 about hinge 159 and the edge of the frame 146 opposite that of hinge 159 is brought into ground contact to support the frame 144.

To secure the angle between the frame 144 and frame 146 the bar 148 is extended straight by means of hinge 158. As shown in more detail in FIGS. 16 through 19 the angle of the frame 144 relative to the seat 140 can be securely adjusted by fitting any of the several notches 150 over the bar 160 (shown in FIG. 15). A user of the chair assembly 303 may desire to adjust the angle of the frame 144 relative to the seat 140 to increase comfort by reclining to a lesser or greater degree.

Back 142 is disposed between the edges of frame 144 to provide a soft and resilient surface upon which a user of the chair assembly 303 may rest their back. Back 142 may be constructed of a fabric, plastic, natural fiber or other material suitable for a user to rest against while sitting in the chair assembly 303 while in stationary mode.

Figure 20:
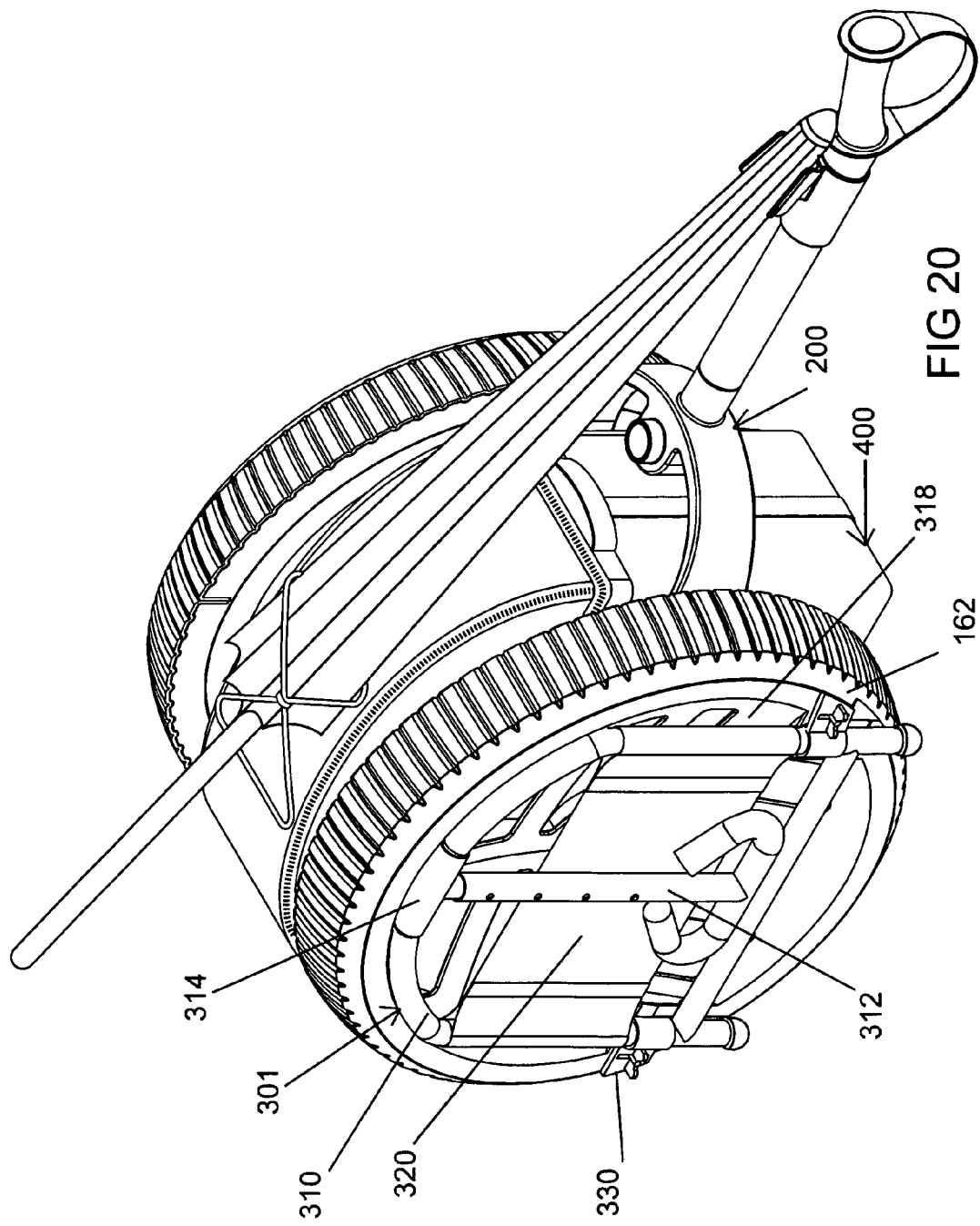
FIG. 20 is a perspective view of a version of the device in a transport mode.

FIG. 20 shows another variation of the invention particularly demonstrating a variation of a chair assembly 301 that is shown to include, inter alia, a wheel 162, a frame 310, a support 312, a hinge 314, a seat 318, a back 320 and a clip 330. The yoke assembly 200 and case assembly 400 remain similar to those shown in FIG. 2. FIG. 20 shows the chair assembly 301 in transport mode, ready to travel to the beach.

A user of the chair assembly 301 in stationary mode places the wheel 162 in ground contact with the seat 318 side up. The user is able to sit on seat 318 cleanly off the ground and recline her body onto back 320. Back 320 is preferably a durable material such as fabric, plastic, natural fiber or other material suitable for a user to rest against while sitting in the chair assembly 301. The back 320 is supported on its edges by frame 310.

Figure 21:
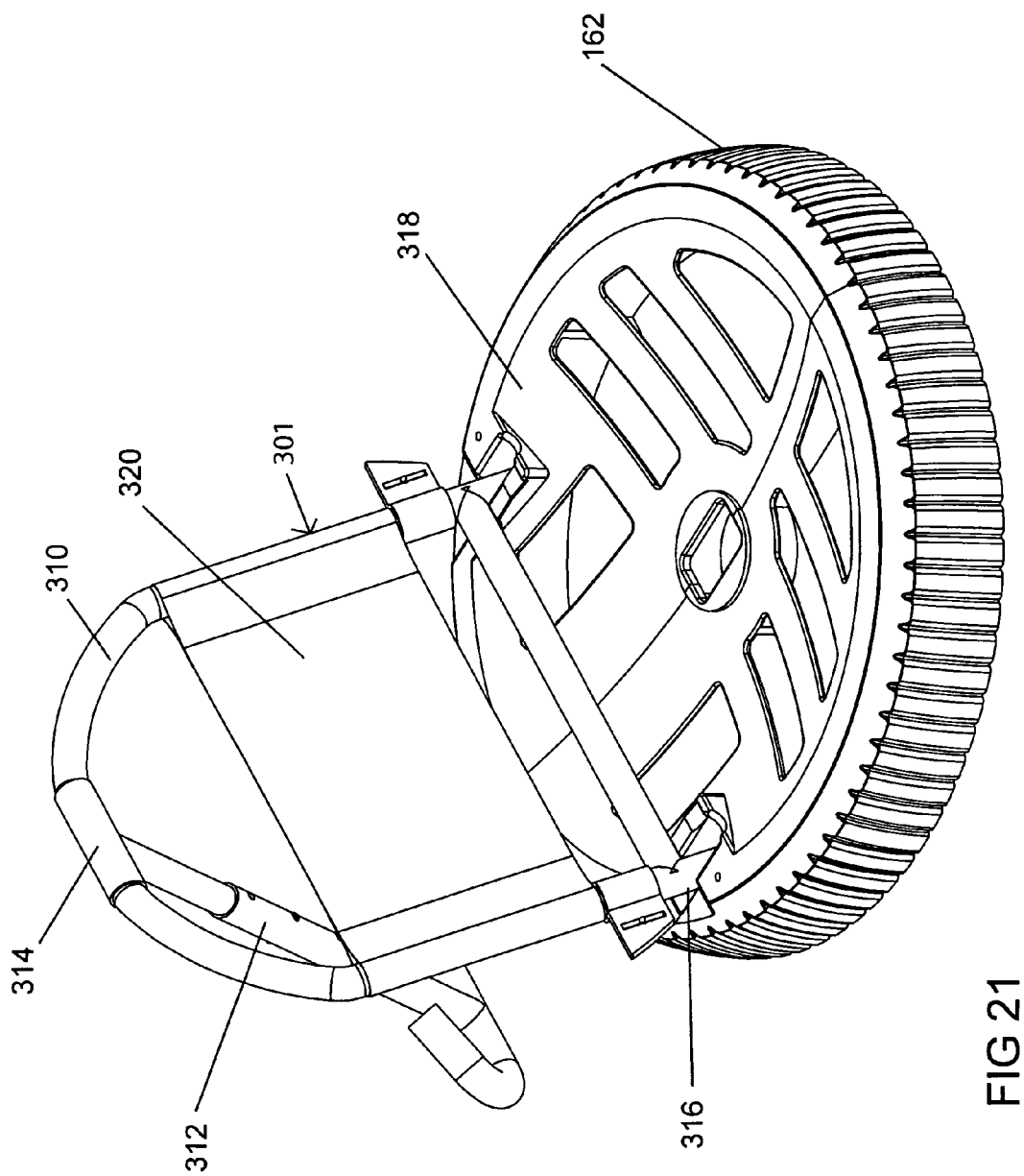
FIG. 21 is a perspective view of a chair as shown in FIG. 20 in a stationary mode.

FIG. 21 represents the chair assembly 301 removed from the other components of the invention shown in FIG. 20 and erected into the stationary mode of the chair assembly 301. FIGS. 22 through 24 illustrate the sequence of steps of transforming the chair assembly 301 from transport mode as best shown in FIG. 22 into stationary mode as depicted in FIGS. 21 and 24.

Generally to transform the chair assembly 301 into it stationary mode the wheel 162 is placed on a surface (i.e. ground, sand, pavement, bleacher, etc. . . . ) and frame 310 is raised from against the wheel 162 about hinge 316 to form a seat back as shown in FIG. 23. The support 312 is then rotated away from frame 310 about hinge 314. The end of frame 312 opposite that of hinge 314 is placed in ground contact to act as a brace to maintain the angle between the frame 310 and the seat 318.

Optionally, the length of support 312 may be adjustable to better support the frame 310 at the desired angle relative to the seat. The adjustability can be achieved by forming the support 312 from concentric tubes. An outer tube having a series of holes may be provided to accept a snap clip inside of an inner tube. The snap clip may then be selectively engaged into any of the holes on said outer tube to achieve the appropriate length of the frame. Said tubes that comprise the frame 312 may effectively have round, square, oval or other suitable cross section profile. Said frame 312 and frame 310 is optimally constructed of aluminum, plastic or any other light weight and rigid material known in the art.

Figure 25:
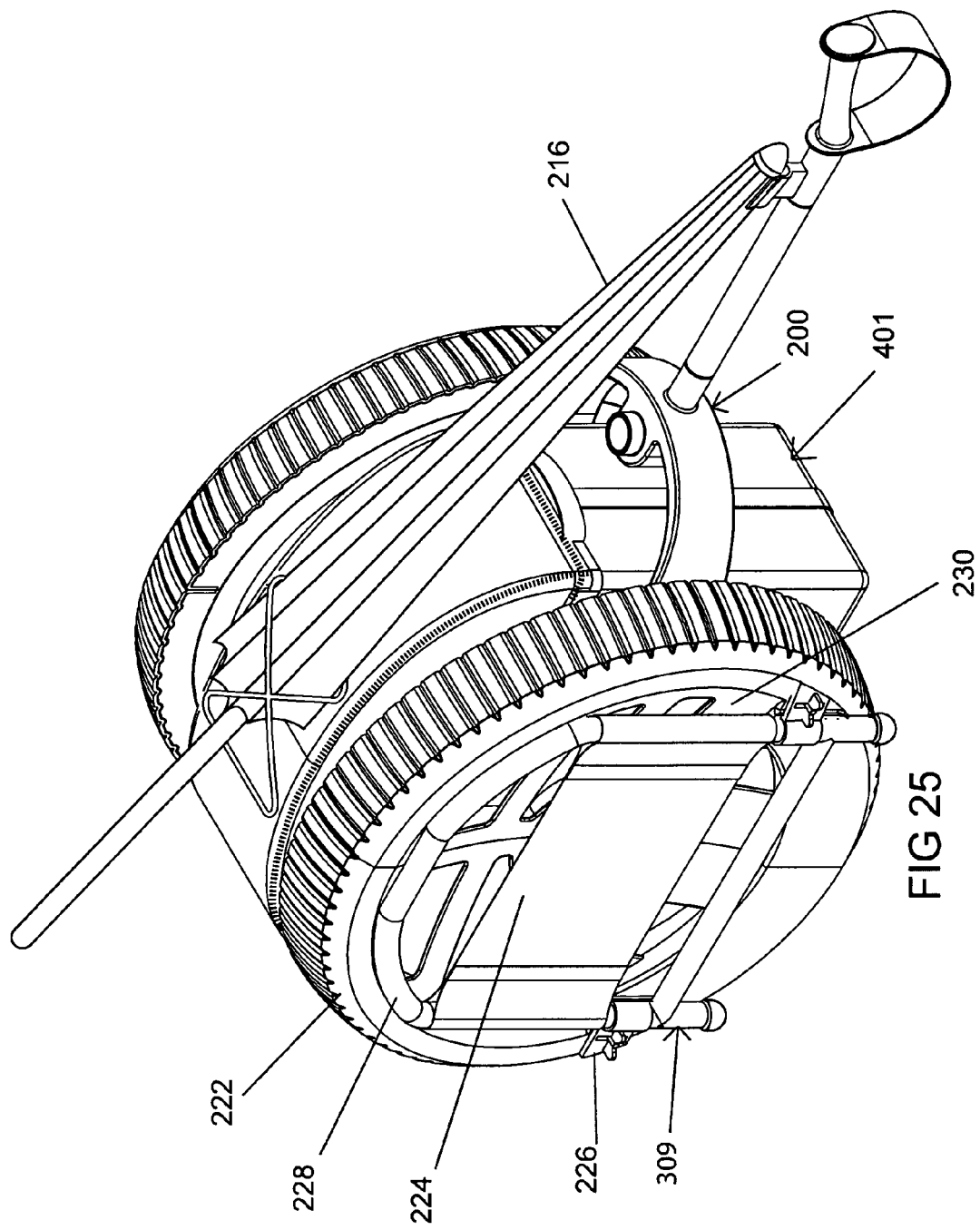
FIG. 25 shows perspective view of a variation of the device in transport mode.
Figure 26:
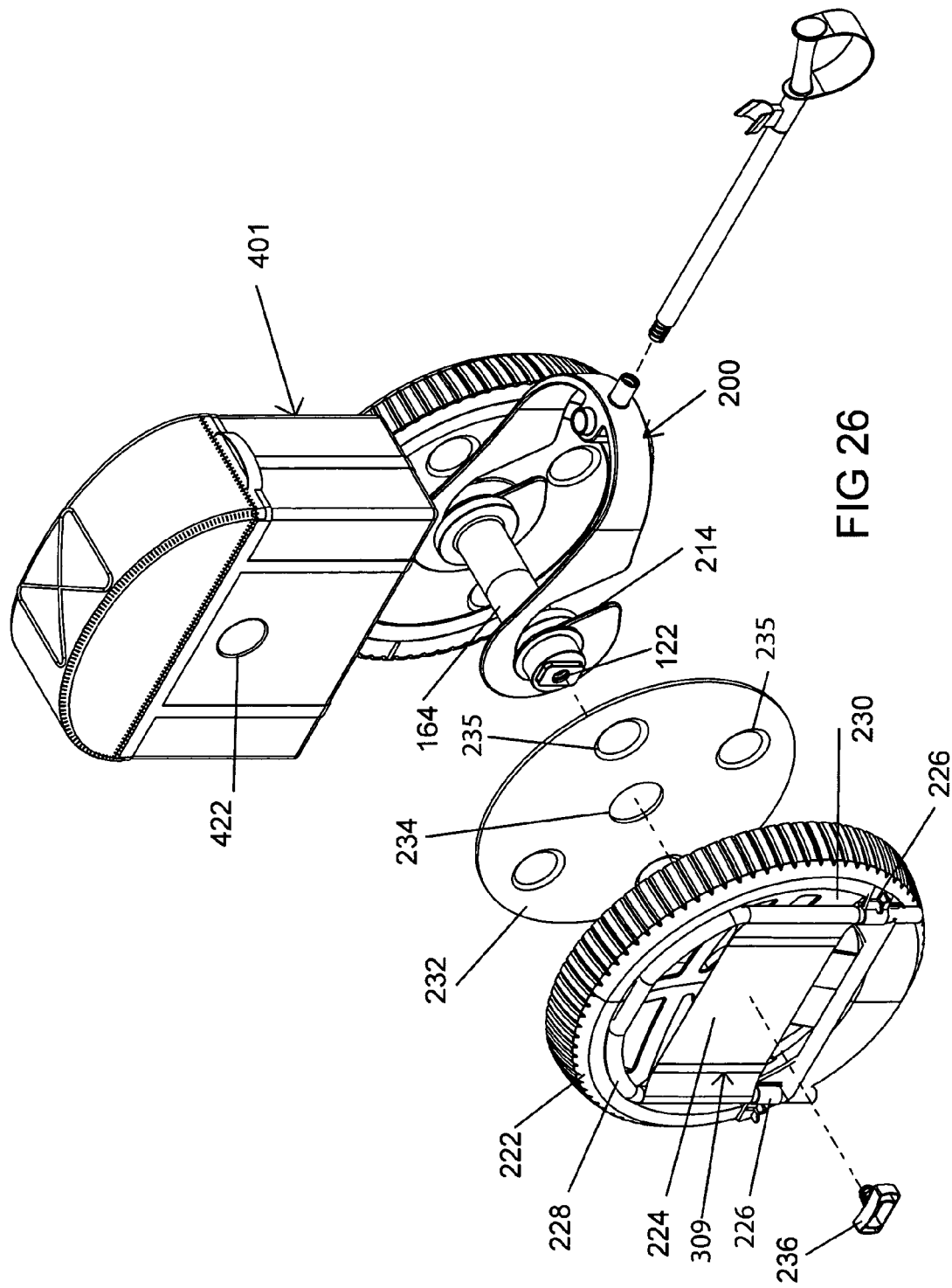
FIG. 26 is an exploded perspective view of various components of the device as shown in FIG. 25.

FIGS. 25 and 26 show a variation of the present invention in transport mode and particularly emphasizes alternate chair assembly 309 and alternate case assembly 401 while the yoke assembly 200 remains similar to the yoke assembly 200 shown in FIG. 2. Said alternate chair assembly 309 is shown to include, inter alia, a wheel 222, a back 224, a clip 226, a frame 228, a seat 230, a disk 232, a bore 234, cup holders 235 and a fastener 236. Said alternate case assembly 401 is shown to include, inter alia, a bore 422. Other elements of FIGS. 25 and 26 include a fork 214, an umbrella 216, threads 122 and an axle 164.

Said case assembly 401 utilizes the axle 164 penetrated through bore 422 to support the case assembly 401. Said axle 164 is set into said fork 214 of the yoke assembly 200 so that the case assembly 401 is suspended above the ground when transporting the invention on its wheels 222. In other regards the case assembly 401 is similar to the case assembly 400 shown in FIGS. 12 and 13.

Yet referring to FIG. 26 the disk 232 has a multiplicity of cop holders 235 arranged in a predetermined pattern around the periphery of the table and are dimensioned to accept commonly sized beverage containers. The disk 232 and axle 164 may be erected into a table when converted into stationary mode similar to the disk 106 and axle 104 as shown in FIG. 3 and described above.

When assembled into transport mode the axle 164 passes through the bore 422 in the case assembly 401. The axle 164 then rests one end on each of the forks of the yoke assembly 200. One each of said disks 232 is nested against the edge of each wheel 222 opposite the seat 230. For each of said wheel assemblies 309 of the pair, said bore 234 and a bore 336 (shown best in FIG. 27) on the center of the wheel 222 are fitted onto the end of each respective end of the axle 164 and removably secured to the axle 164 by said fastener 236 engaging said threads 122. One each of said chair assemblies 309 is removably attached to each of said wheels 222 on the seat 230 side of said wheels 222 by means of a clip 226. Preferably a multiplicity of clips 226 are used to secure the chair assembly 309 to the wheel 222 while use in transport mode.

Referring to FIGS. 27 through 31 where a more detailed view of the chair assembly 309 and it's several adjustments are demonstrated and shown to include, inter alia, a wheel 222, a back 224, a frame 228, a seat 230, peg 332, notch 334, bore 336, a cap 424 and a channel 426.

Figure 27:
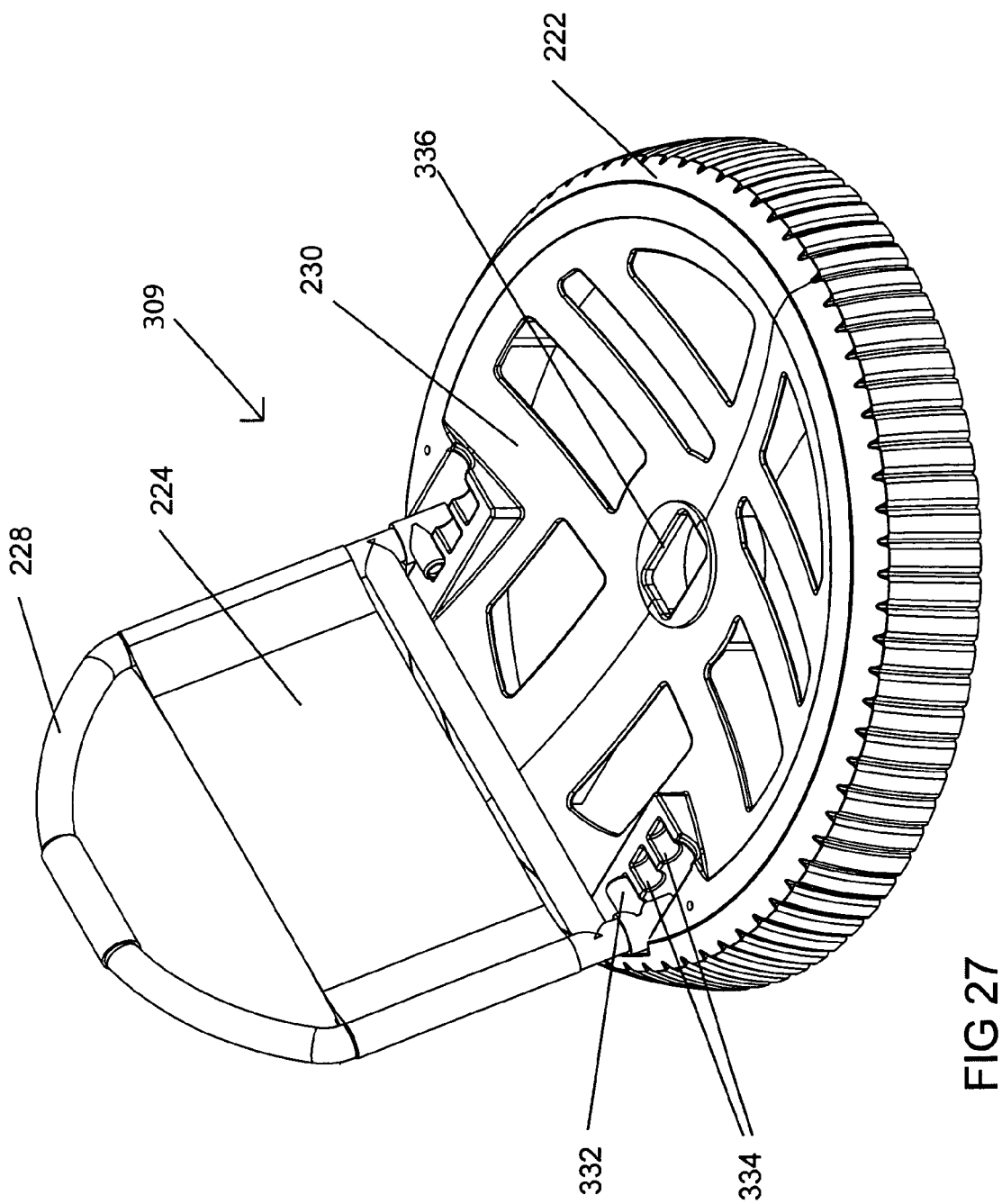
FIG. 27 is a perspective view of a chair as shown in FIG. 25 in a stationary mode.

FIG. 27 illustrates the chair assembly 309 in stationary mode, ready to be used as a chair. The wheel 222 is placed onto a surface such as the ground, a bleacher, sand or other appropriate surface with the seat 230 side up. The frame 228 is erected from its position against the seat 230 as it is used in transport mode (see FIG. 25). Pegs 332 formed integral to the frame are set into any of the predetermined notches 334 to secure the angle of the frame 228 relative to the seat 230. A back 224 spans between edges of the frame 228 to provide a stable support for a person using the chair assembly 309 a comfortable surface to recline upon.

FIGS. 28 through 31 demonstrate in more detail the varying degrees of reclination that frame 228 may be adjusted to relative to the seat 230. FIG. 28 includes the cross section reference line 29 that corresponds to the cross section view in FIG. 29. FIGS. 30 and 31 are cross sectioned at the same plane on the wheel 222 as FIG. 29.

Generally, the frame 228 is held in place gravity. The pegs 332 on each side of the frame 228 engage into one of the several notches 334 on each side of the seat 230. Caps 424 on each end of the frame 228 seat on each side into the channel 426. When the pegs 332 are set into the pair of notches 334 nearer the center of the seat 230 the frame 228 and therefore back 224 are oriented more towards the vertical relative to the plane of the seat 230. As pegs 332 are engaged into notches 334 further from the center of the seat 230 the back 224 reclines further. It can be appreciated that a user of the chair may find it more comfortable to sit in the chair assembly 309 with the back 224 at varying degrees of recline.

It would be understood that any of the wheels 102 (or other variations of wheels) may be rotatably attached to an axle 104 (or other variations of an axle) by means of ball bearings, roller bearings or other type of means commonly available in the art to permit the wheels 102 to readily rotate and remain durable. Any of the wheels 102 (or other variations of wheels) may have a durable cover around the circumference of the wheel 102 such as rubber or other gripping and durable material to grip onto a surface while the device is used in transport mode.

An embodiment of the present invention includes, inter alia, a mobile multi-function convertible transport device comprising a yoke assembly having a yoke on a first end and a and a handle on a second end, two wheel assemblies each having a wheel with a first side and a second side, each of said wheels having a disk coaxially and removably attached to said first side of each of said wheels, said wheels each having an erectable seat back on each of said second side of said wheels, a case assembly having a case openable to provide access to a hollow interior volume, an axle removably connectable to said yoke, where said multi-function convertible transport device is convertible into a transport mode by attaching said case assembly onto the middle of said axle, attaching said axle to said yoke and attaching each of said wheel assemblies to opposite ends of said axle where both wheel assemblies are rotatable, and where said multifunction convertible transport device may be converted to a stationary mode by placing said first side of each of said wheels onto the ground and erecting said seat back on each of said wheels, erecting a table with one of said disks acting as a table base, the other of said disks acting as a table top and said axle acting as a pedestal disposed between said disks.

The mobile multi-function convertible transport device may be further characterized in that said case is insulated. The mobile multi-function convertible transport device may be further characterized in that said yoke includes a means to fasten an umbrella in said transport mode and a means to erect said umbrella in stationary mode.

Alternatively, the mobile transport device may have an axle disposed between a pair of wheels, each of said wheels having a disk coaxially and removably affixed, said axle supporting a case that is openable to access an interior volume, a yoke having a first end with a handle and a second end comprising a fork attached to each end of said axle, said wheels both being removable from said axle and each convertible to transform into a chair with a back, and said disks and said axle being combinable to form an erected table with said axle disposed between the centers of said disks and acting as a vertical pedestal and where one of said disks is a base and the other said disk is a tabletop.

The mobile multi-function convertible transport device may be further characterized in that said case is insulated. The mobile multi-function convertible transport device may be further characterized in that said yoke includes a means to fasten an umbrella in said transport mode and a means to erect said umbrella in stationary mode.

Alternatively, the mobile convertible beach gear device may comprise an axle, a yoke, a pair of wheels, a pair of disks, a pair of chair assemblies and a case that when in a transport mode: each of said wheels has one of said disks coaxially and removably attached on a first side and a chair assembly hingedly attached to a second side, one of said wheels is removably attached to each end of said axle, each of said wheels being rotatable about said axle, said yoke having a first end with a handle and also having a second end comprising a fork, said fork removably attached to each end of said axle, said case supported by said axle and having an accessible interior volume, and that when in a stationary mode: said first side of each of said wheels in contact with a horizontal surface, each of said chair assemblies being hingedly erected to form the back of a chair and said second side of said wheel forming a seat, and said disks and said axle being combinable to form an erected table with said axle disposed between the centers of said disks and acting as a vertical pedestal and where one of said disks is a base and the other said disk is a tabletop.

The mobile multi-function convertible transport device may be further characterized in that said case is insulated. The mobile multi-function convertible transport device as described in claim 7 further characterized in that said yoke includes a means to fasten an umbrella in said transport mode and a means to erect said umbrella in stationary mode.

Alternatively, the mobile multi-function convertible transport may device comprise a yoke assembly having a yoke on a first end and a and a handle on a second end, two wheel assemblies each having a wheel with a first side and a second side, each of said wheels having a disk coaxially and removably attached to said first side of each of said wheels, said wheels each having an erectable seat back on each of said second side of said wheels, a case assembly having a case openable to provide access to a hollow interior volume, and an axle removably connectable to said yoke.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mobile multi-function convertible transport device comprising:
   a yoke assembly having a yoke on a first end and a handle on a second end;
   two wheel assemblies each having a wheel with a first side and a second side;
   each of said wheels having a disk coaxially and removably attached to said first side of each of said wheels;
   said wheels each having an erectable seat back on each of said second side of said wheel;
   a case assembly having a case openable to provide access to a hollow interior volume;
   an axle removably connectable to said yoke;
   where said multi-function convertible transport device is convertible into a transport mode by attaching said case assembly onto the middle of said axle, attaching said axle to said yoke and attaching each of said wheel assemblies to opposite ends of said axle where both wheel assemblies are rotatable;
   where said multifunction convertible transport device may be converted to a stationary mode by placing said first side of each of said wheels onto the ground and erecting said seat back on each of said wheels, erecting a table with one of said disks acting as a table base, the other of said disks acting as a table top and said axle acting as a pedestal disposed between said disks.

2. A mobile multi-function convertible transport device as described in claim 1 further characterized in that said case is insulated.

3. A mobile multi-function convertible transport device as described in claim 1 further characterized in that said yoke includes a means to fasten an umbrella in said transport mode and a means to erect said umbrella in stationary mode.

4. A mobile transport device having an axle disposed between a pair of wheels;
   each of said wheels having a disk coaxially and removably affixed;
   said axle supporting a case that is openable to access an interior volume;
   a yoke having a first end with a handle and a second end comprising a fork attached to each end of said axle;
   said wheels both being removable from said axle and each convertible to transform into a chair with a back;
   said disks and said axle being combinable to form an erected table with said axle disposed between the centers of said disks and acting as a vertical pedestal and where one of said disks is a base and the other said disk is a tabletop.

5. A mobile multi-function convertible transport device as described in claim 4 further characterized in that said case is insulated.

6. A mobile multi-function convertible transport device as described in claim 4 further characterized in that said yoke includes a means to fasten an umbrella in a transport mode and a means to erect said umbrella in a stationary mode.

7. A mobile convertible beach gear device comprising an axle, a yoke, a pair of wheels, a pair of disks, a pair of chair assemblies and a case;
   that when in a transport mode:
   each of said wheels has one of said disks coaxially and removably attached on a first side and a chair assembly hingedly attached to a second side;
   one of said wheels is removably attached to each end of said axle each of said wheels being rotatable about said axle;
   said yoke having a first end with a handle and also having a second end comprising a fork;
   said fork removably attached to each end of said axle;
   said case supported by said axle and having an accessible interior volume;
   and that when in a stationary mode:
   said first side of each of said wheels in contact with a horizontal surface, each of said chair assemblies being hingedly erected to form the back of a chair and said second side of said wheel forming a seats said disks and said axle being combinable to form an erected table with said axle disposed between the centers of said disks and acting as a vertical pedestal and where one of said disks is a base and the other said disk is a tabletop.

8. A mobile multi-function convertible transport device as described in claim 7 further characterized in that said case is insulated.

9. A mobile multi-function convertible transport device as described in claim 7 further characterized in that said yoke includes a means to fasten an umbrella in said transport mode and a means to erect said umbrella in stationary mode.

10. A mobile multi-function convertible transport device comprising:
   a yoke assembly having a yoke on a first end and a and a handle on a second end;
   two wheel assemblies each having a wheel with a first side and a second side;
   each of said wheels having a disk coaxially and removably attached to said first side of each of said wheels;
   said wheels each having an erectable seat back on each of said second side of said wheels;
   a case assembly having a case openable to provide access to a hollow interior volume;
   an axle removably connectable to said yoke.

* * * * *